July 1, 1941. F. M. CARROLL ET AL 2,247,906
ACCOUNTING MACHINE
Filed Nov. 6, 1937 15 Sheets-Sheet 2

INVENTORS
Fred M. Carroll
Carl O. Anderson
BY
ATTORNEY

July 1, 1941.　　F. M. CARROLL ET AL　　2,247,906
ACCOUNTING MACHINE
Filed Nov. 6, 1937　　15 Sheets-Sheet 4
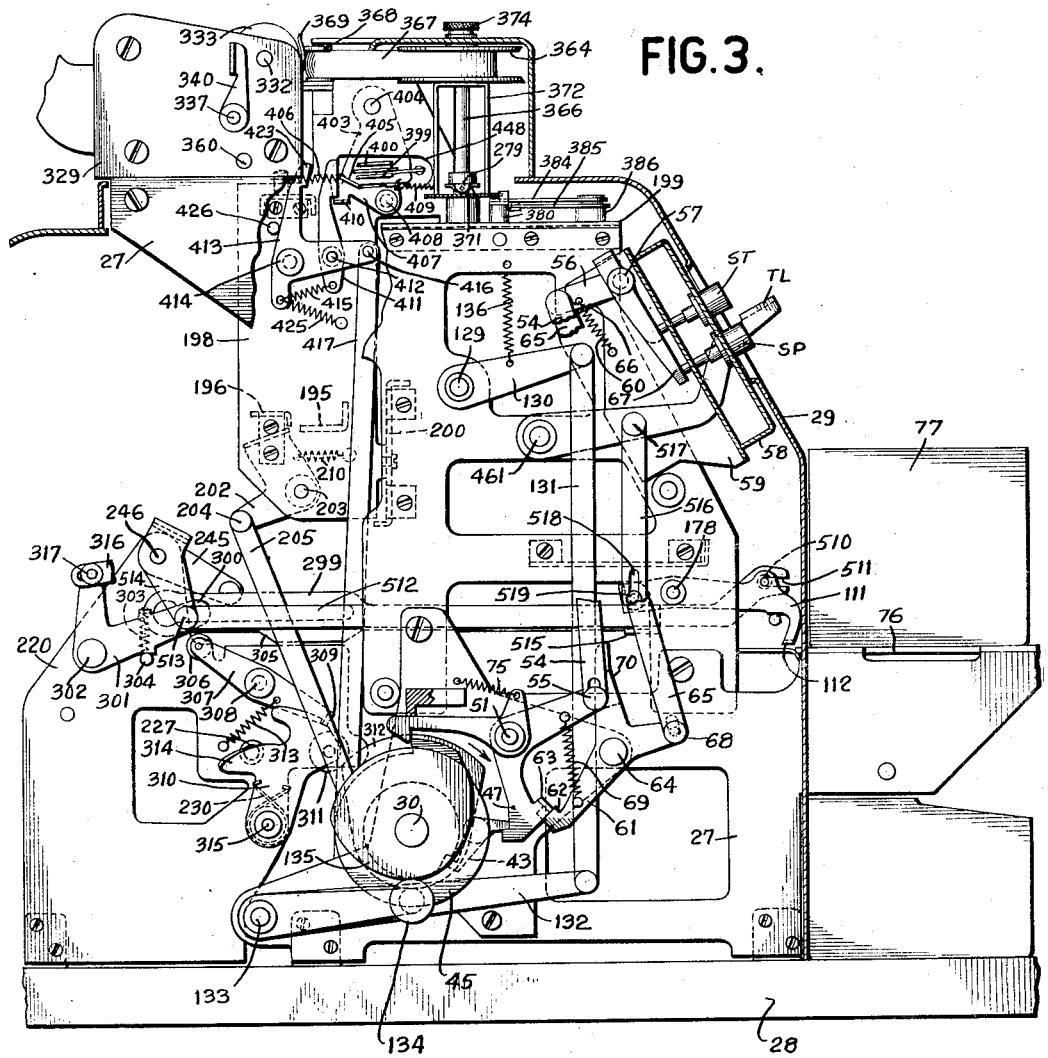
FIG.3.
FIG.4.　　FIG.5.
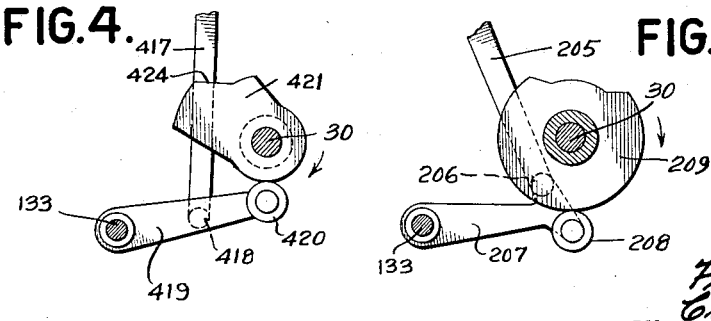
INVENTORS
Fred M. Carroll
Carl O. Anderson
BY
ATTORNEY July 1, 1941.  F. M. CARROLL ET AL  2,247,906
ACCOUNTING MACHINE
Filed Nov. 6, 1937  15 Sheets-Sheet 6

INVENTORS
Fred M. Carroll
Carl D. Anderson
BY
ATTORNEY

July 1, 1941.　　　F. M. CARROLL ET AL　　　2,247,906
ACCOUNTING MACHINE
Filed Nov. 6, 1937　　　15 Sheets-Sheet 8

INVENTORS
Fred M. Carroll
Carl O. Anderson
BY
ATTORNEY

July 1, 1941.　　F. M. CARROLL ET AL　　2,247,906
ACCOUNTING MACHINE
Filed Nov. 6, 1937　　15 Sheets-Sheet 9
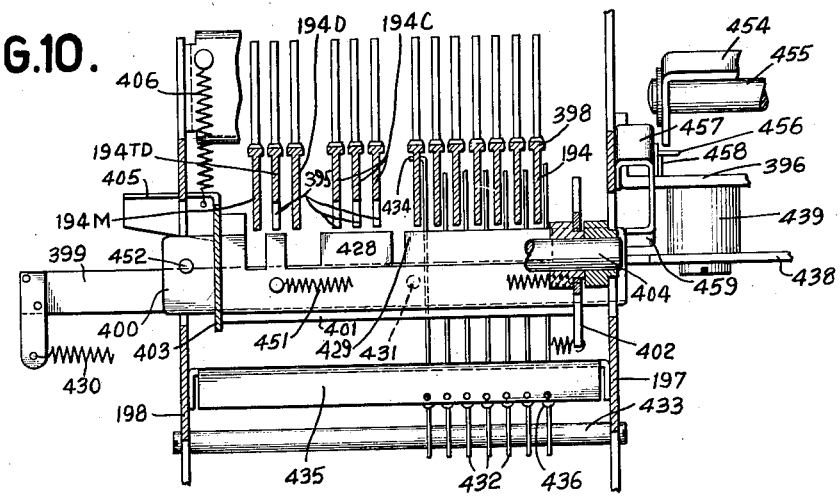
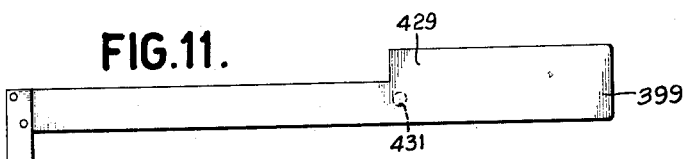
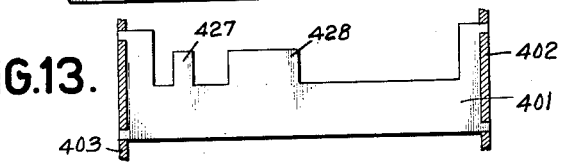

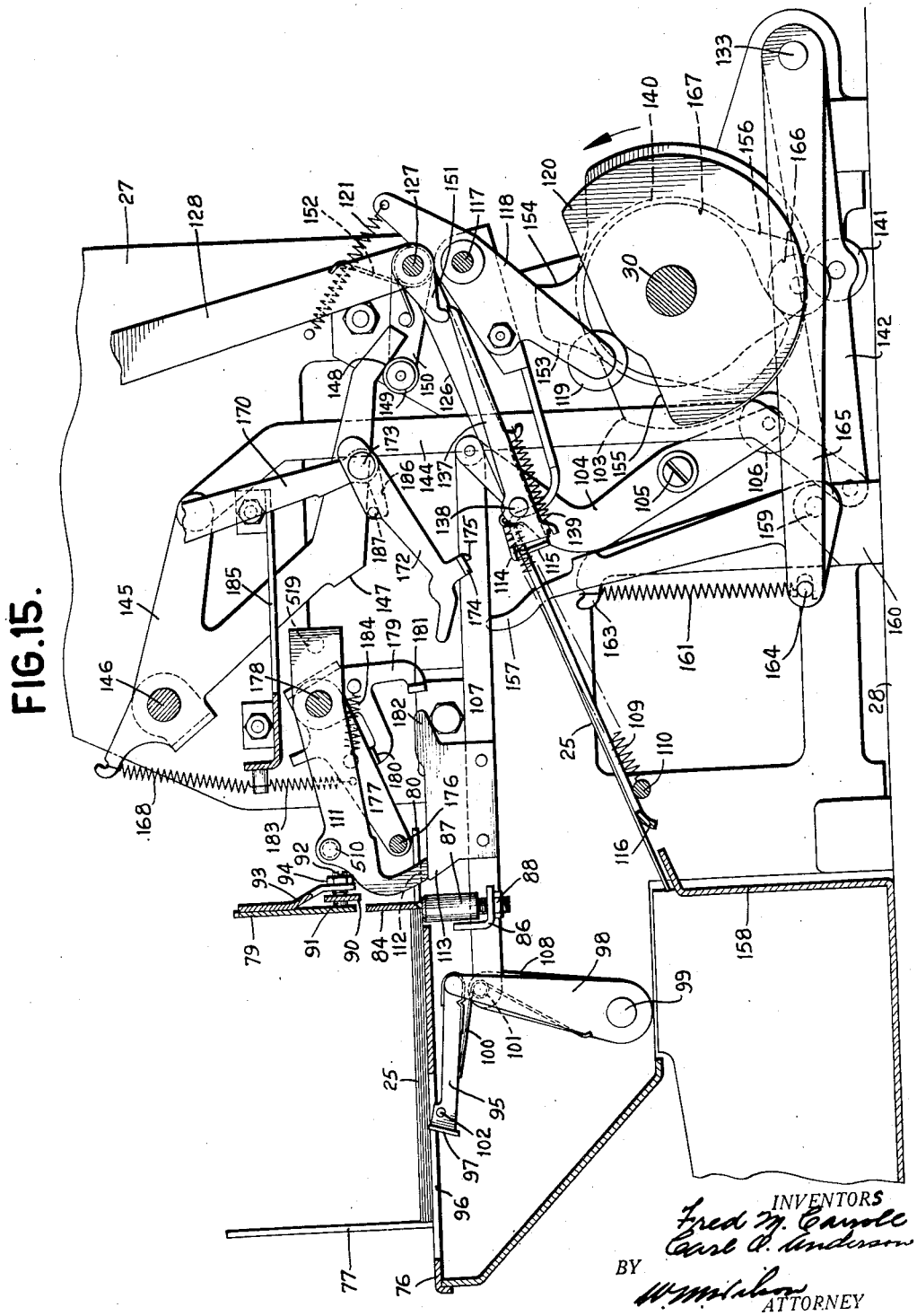

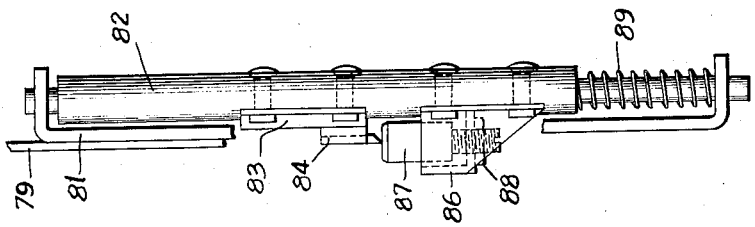
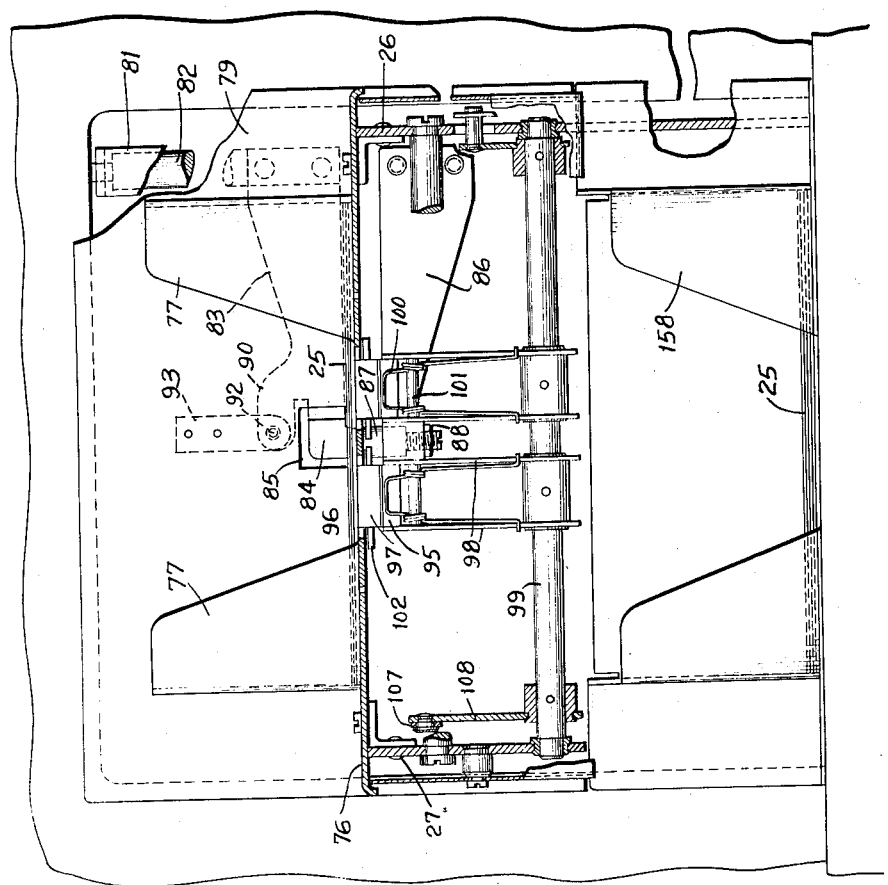

July 1, 1941.    F. M. CARROLL ET AL    2,247,906
ACCOUNTING MACHINE
Filed Nov. 6, 1937    15 Sheets-Sheet 12

July 1, 1941.  F. M. CARROLL ET AL  2,247,906
ACCOUNTING MACHINE
Filed Nov. 6, 1937  15 Sheets-Sheet 14

INVENTORS
Fred M. Carroll
Earl O. Anderson
BY
ATTORNEY

July 1, 1941.  F. M. CARROLL ET AL  2,247,906
ACCOUNTING MACHINE
Filed Nov. 6, 1937   15 Sheets-Sheet 15
FIG.20.
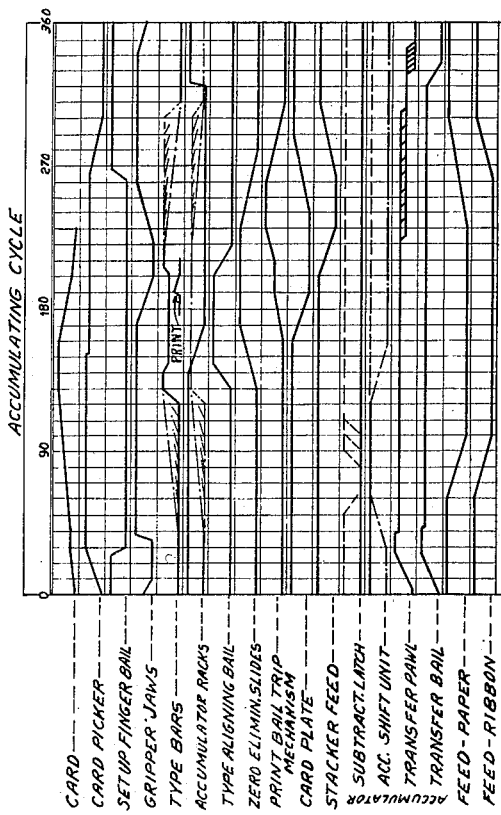
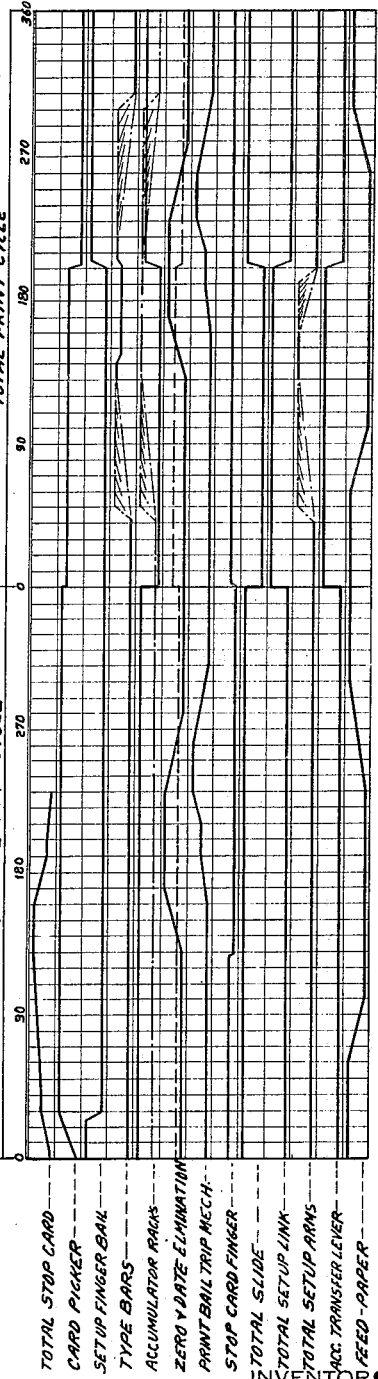
INVENTORS
Fred M. Carroll
Carl D. Anderson
BY
ATTORNEY Patented July 1, 1941

2,247,906

UNITED STATES PATENT OFFICE 2,247,906

ACCOUNTING MACHINE

Fred M. Carroll, Binghamton, and Carl O. Anderson, Endicott, N. Y., assignors to International Business Machines Corporation, New York, N. Y., a corporation of New York Application November 6, 1937, Serial No. 173,106

3 Claims. (Cl. 235—61.9)

This invention relates generally to improvements in accounting machines for adding and subtracting amounts and printing items and totals, and more specifically it concerns a record card controlled machine which senses the credit or debit nature of the transaction represented by each card and thereby controls the selective addition or subtraction of the amounts represented by perforations in the cards.

A set of cards is placed in the hopper at the front of the machine and picked off one by one and fed into the machine. The cards serve as direct actuators for a differential mechanism which adjusts a set of type bars and operates a group of accumulating wheels. The date, class of transaction, and amount represented by each card are printed on each cycle and then later, after all cards of the group have been sensed, the machine automatically stops and requires a total taking cycle. The total printed is a balance resulting from the subtraction of a series of debit items from another related series of credit items.

An object of the invention is the provision of an improved form of driving mechanism wherein clutching devices are not only controlled by start and stop keys, but there is also a direct mechanical connection to card sensing devices for disconnecting the main operating shaft from the driver when a total card appears or when the record card supply is exhausted.

Another object of the invention is the provision of means for eliminating date printing when printing a total. The dates represented on each of the item cards are printed along therewith, but when a total is selected, the date printing type bars are not struck because shoulders on a striking plate that usually cooperates with the bars are withheld from association therewith.

Other objects of the invention will be pointed out in the following description and claims and illustrated in the accompanying drawings, which disclose, by way of example, the principle of the invention and the best mode, which has been contemplated, of applying that principle.

The invention is illustrated by a set of drawings which accompany and form part of the specification.

In the drawings:

Fig. 3 is a side elevation view showing the mechanism on the left side frame of the machine.

Fig. 4 is a detail view of the printer operating cam.

Fig. 5 is a detail view of the type bar alining control cam.

Fig. 10 is a plan view partly in section showing the printing devices.

Fig. 11 is a detail view of the zero eliminating striking plate.

Fig. 12 is a detail view of the date eliminating striking plate.

Fig. 13 is a detail view of the fixed date and classification striking plate.

Fig. 14 shows an example of a record card.

Fig. 15 is a side view of the card feeding and differential control mechanisms.

Fig. 15A is a view partly in section, showing the card hopper, card throat, card picking mechanism, and stacker.

Fig. 15B is a side elevation view of the adjustable throat opening mechanism.

Fig. 20 is a timing chart of the cams controlling the operation of the machine.

Figure 1:
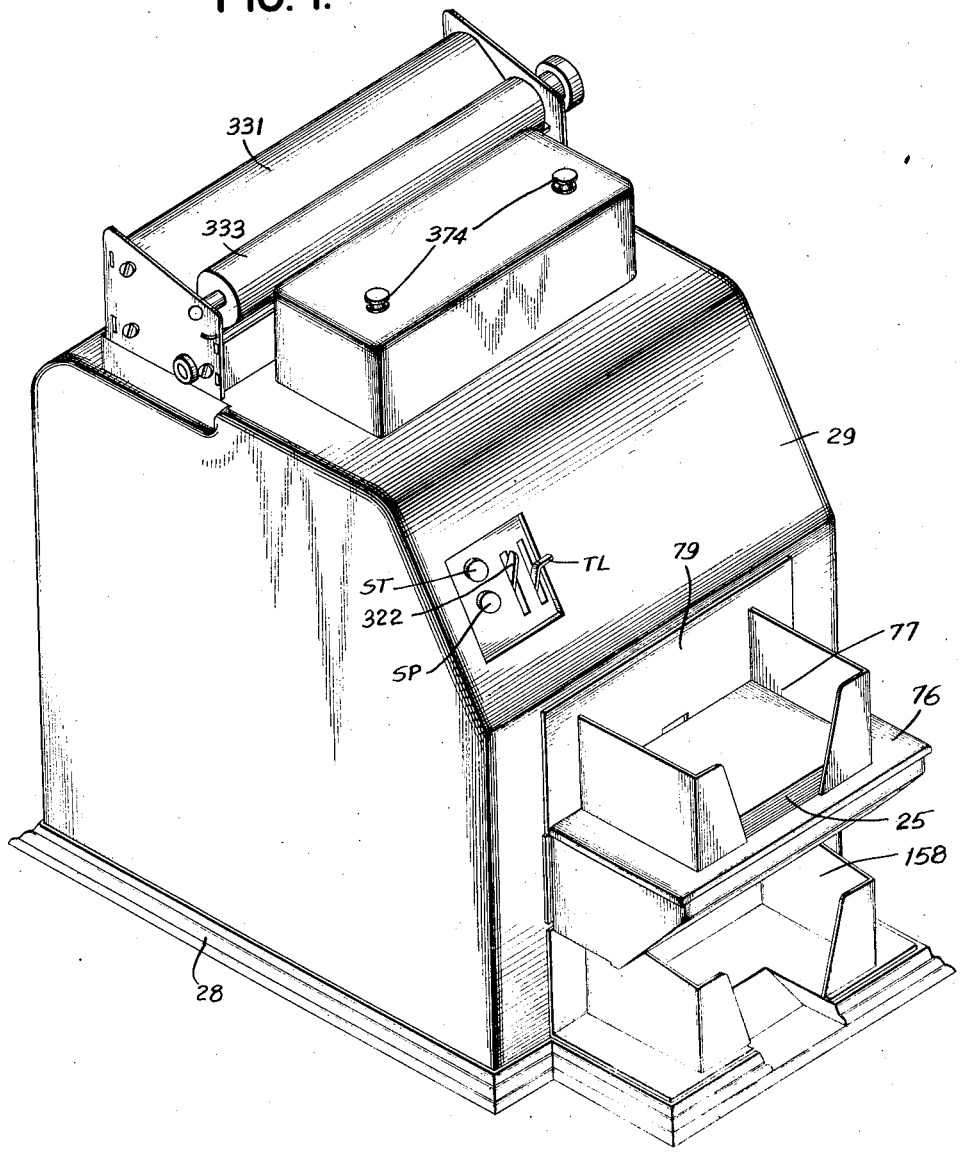
Fig. 1 is a perspective view of the machine.

In Fig. 14 there is shown an example of the perforated card 25 which is used to control the machine to make an auditing record. This card is of the kind punched by the counter machine set forth in copending application, Serial No. 37,443, filed August 23, 1935. Each card contains three sets of perforations representing a date, a transaction and an amount. The perforations are located differential distances from the bottom edge of the card in the well known Hollerith system. The card shown in Fig. 14 represents a cash sale of $27.53 made on June 23.

The transaction perforation positions are divided into two groups, an upper credit group including Cash sale, Charge sale, C. O. D. sale and C. O. D. collection perforation positions; and a lower debit group comprising Merchandise returned for cash, Merchandise returned on account and Cash on account positions. The accumulating devices of the machine are controlled by these transaction perforations to add the amounts accompanied by a transaction perforation in one of the upper positions and subtract all amounts identified by a transaction mark in any of the three lower debit positions.

The machine of the present invention is adapted to sense a stack of cards such as card 25, one by one, and print a record of the data found thereon; and selectively add and subtract the amounts and print a total or balance figure.

A total card 24 (Fig. 14) is shaped the same as the item cards 25 except that the upper corners are cut off and the card is free of data perforations. The presence of a total card is sensed by a finger which normally rests on a corner of an item card when it extends out of the hopper, but when the total card is extended, this finger is unsupported and it then drops to effect a lockup of the machine as explained more fully hereinafter.

A pair of main side frames 26 and 27 are fastened to a base casting 28 as supports for most of the mechanism. A case 29 covers all the mechanism except the card hopper and discharge stack, the platen, the record sheet, and the total, start, stop and all-add control keys.

*The clutch and driving connections*

Figure 7:
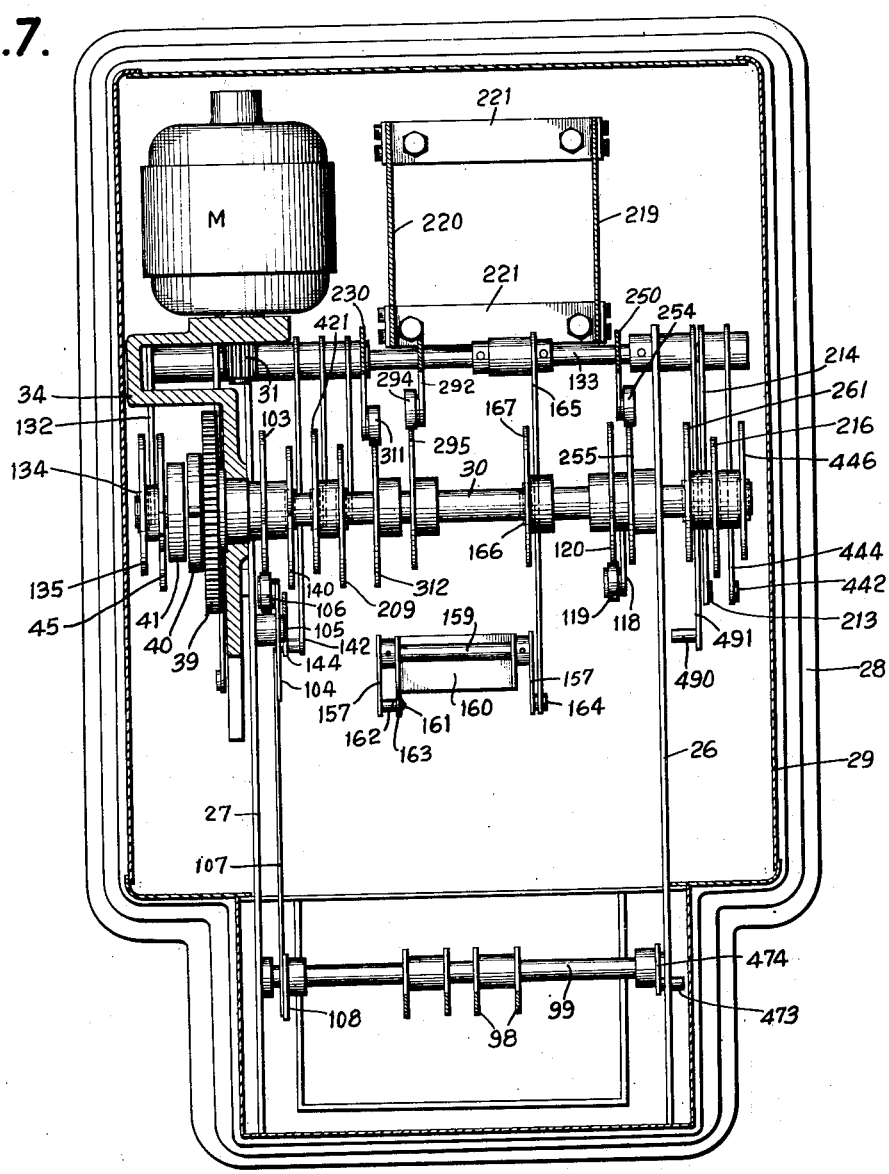
Fig. 7 is a plan view of the main driving mechanism and main operating shaft of the machine.
Figure 8:
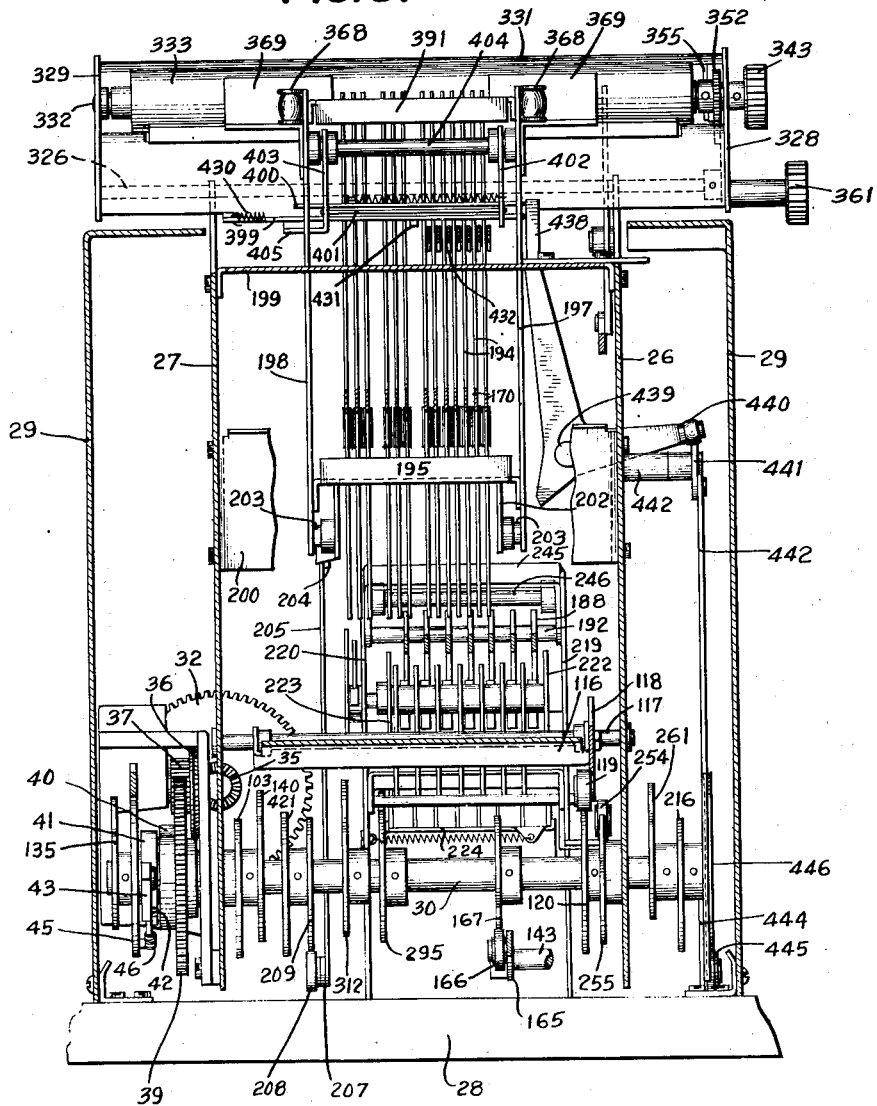
Fig. 8 is a front elevation view showing the parts at the center of the machine.
Figure 9:
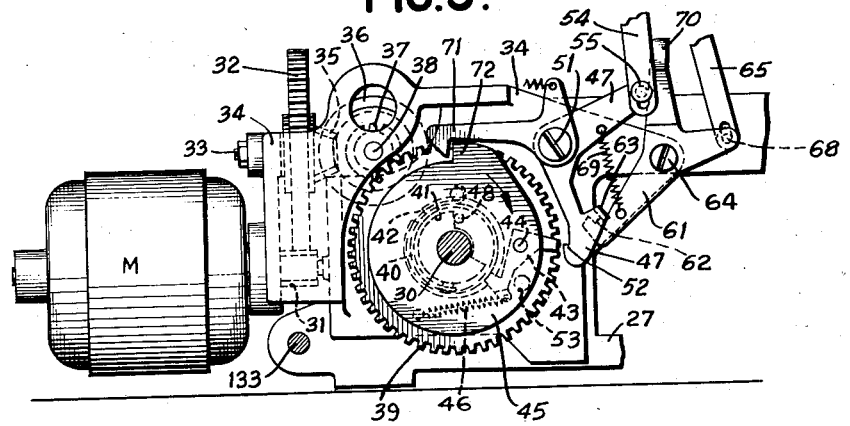
Fig. 9 is a side view of the clutching devices.

The machine is operated by a motor M (Fig. 7) which drives a main operating shaft 30 through a gear reduction and clutch unit shown in Fig. 9 and at the left in Figs. 7 and 8. Fastened to the shaft of motor M is a pinion 31 which meshes with an idler gear 32 loosely pivoted on a screw stud 33 fastened to a clutch bracket 34 fixed to the outside of the left side frame 27. Fixed to gear 32 is a bevel pinion 35 meshing with a bevel gear 36 attached to a plain pinion 37, both of the latter turning freely on a pivot 38 which protrudes inwardly from the outer wall of bracket 34. Pinion 37 meshes with a clutch driving gear 39 loosely pivoted on shaft 30. Attached to gear 39 through a spiral shock absorbing spring 40 (Fig. 9) is a clutch driver 41 with a pair of notches 42 for receiving the end of a clutch pawl 43 pivoted at 44 on a clutch disc 45 fastened to shaft 30. A pin 48 extends from gear 39 into a 90° slot in driver 41 to start the main shaft in a positive manner if the spring 40 fails to overcome the initial load.

A coil spring 46 drawn between pawl 43 and a stud in disc 45 tends to engage the two, but normally the pawl is held out of engagement by a clutch stop lever 47 pivoted at 51 on a web of bracket 34. A shoulder 52 on the lower end of lever 47 normally abuts under the horizontal arm of pawl 43 to swing the pawl in a counterclockwise direction against a pin 53, in which position the end of the pawl clears the driver 41.

Figure 3A:
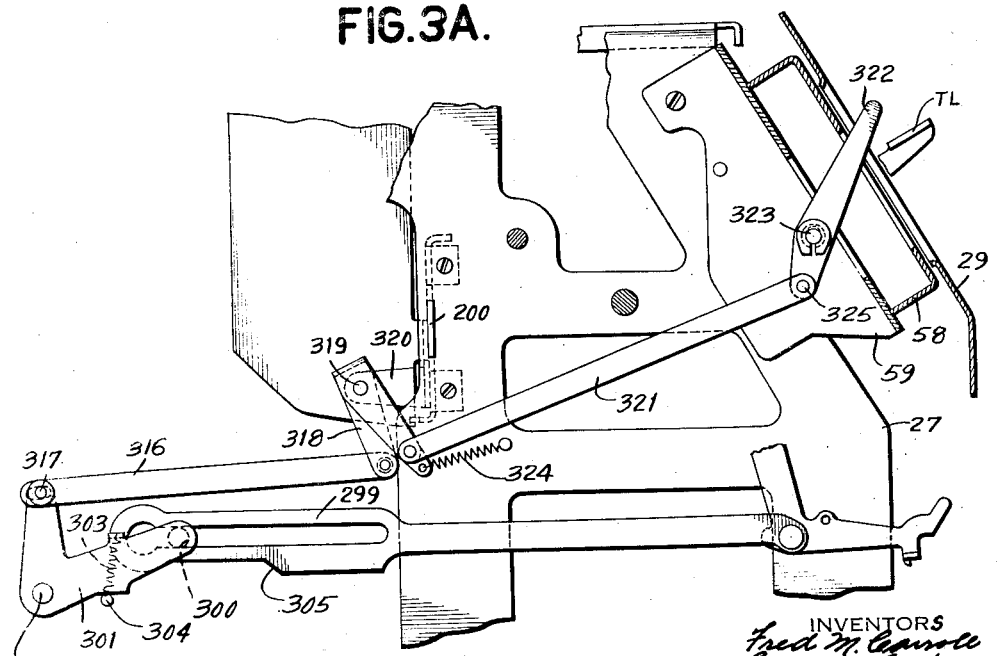
Fig. 3A is a side elevation of the all-add control mechanism.

When it is desired to start the machine in operation, lever 47 is given a short counterclockwise movement to free the end of clutch pawl 43. This is done by a link 54 having a pin and slot connection 55 to the upper end of clutch lever 47. At its upper end, link 54 is articulated on a bell crank 56 (Fig. 3) pivoted on a stud 57 with an offset arm underlying a start key ST. The key slides in a box 58 fastened to an angle piece 59 fixed to the left side frame 27. A spring 60 holds the crank arm up against the lower end of key ST and raises the key so that it extends beyond the box and an opening in the case 29. However, when the operator depresses key ST, the crank 56 is rocked clockwise, link 54 is lifted, lever 47 is rocked counterclockwise and pawl 43 is free to engage the driver and connect shaft 30 to the motor M.

As lever 47 is rocked to start machine operation, it is latched in the operated position (Fig. 9) by a stop latch lever 61 with a shoulder 62 that engages under a lug 63 on lever 47. Stop lever 61 is pivoted at 64 on bracket 34 and is formed with three arms one of which is connected to a vertical link 65 by pin and slot joint 68. This link is connected at the upper end to a bell crank 66 pivoted on the same stud 57 with crank 56. However, an arm 67 of crank 66 is long enough to underlie a stop key SP mounted below key ST in box 58. A spring 69 urges lever 61 clockwise into latching position. When the stop key is depressed, crank 66 is rocked in a clockwise direction, link 65 is lifted, lever 61 is rocked counterclockwise and shoulder 62 thereon is moved away from lug 63 so that spring 60 may rock lever 47 clockwise in a position wherein shoulder 52 is in the path of the arm on pawl 43. As the pawl strikes shoulder 52 (Fig. 3) it is disengaged from the driver 41 and the main shaft 30 comes to rest in the home position.

When the machine is stopped manually by operation of the stop key SP as explained hereinbefore, it is possible that the operator may stop the machine at any time. Other means are provided to automatically stop the machine after a predetermined number of cards have been sensed, or after the supply of cards is exhausted. These automatic devices include stop cards or total cards 24 which are inserted between different groups of related amount cards 25 so that the operator need not watch the machine to determine when to stop it. For this purpose the stop latch lever 61 is provided with a vertical offset arm 70 which is operated through the stop card controls to trip lever 47 into stopping position in a manner explained more fully hereinafter.

As the main shaft 30 and the connections thereto are brought to a stop by the engagement of pawl 43 with shoulder 52 on lever 47, rebounding is prevented by means of a hook lever 71 which engages behind an extension 72 on disc 45 as soon as the main shaft arrives in the home position. This lever 71 is pivoted on screw stud 51 and is provided with a spring 75 tending to pull it into locking engagement.

*The card feed device*

The record cards 25 are placed in a hopper at the front of the machine and fed therefrom in succession toward the rear of the machine. After each card reaches the center of the machine its motion is reversed and it is allowed to slip into a storage stacker at the front of the machine directly under the feeding hopper.

The front part of the two side frames 26 and 27 is extended to form a support for a table plate 76 (Figs. 2, 6 and 15A) upon which the cards 25 rest. Fastened to plate 76 is a pair of vertical guides 77 forming a hopper opening in which the cards are placed face down to be analyzed. The bottom edge 78 (Fig. 14) of the card is placed at the rear of the hopper to lead in entering the machine. The back plate 79 of the hopper is fastened to the side frames and formed with a rearwardly extending offset 80 spaced a short distance above plate 76 to provide an opening through which the cards are fed into the machine.

An adjustable throat opening is provided to insure that only one card enters at a time. Attached to the back of plate 79 (Fig. 15B) is a long vertical bracket 81 with horizontal ears in which slide the reduced ends of a throat rod 82. Riveted to the middle of the rod 82 is an extending throat member 83 with an offset pointed end 84 which protrudes through an opening 85 (Fig. 15A) in the back plate 79. Riveted to the lower part of rod 82 is a bracket 86 supporting a threaded stud 87 directly under the end 84 of the throat member. By means of the thread, stud 87 may be adjusted to provide the required throat opening under end 84 and then be locked in place by nut 88.

Another adjustable connection is provided so that the throat opening parts may be moved up or down as a whole until the desired vertical position is reached in alignment with the bottom card in the hopper. A spring 89 around the lower end of rod 82 tends to push the rod upward, but the rod and all parts thereon are held in the proper position by pinching an extension 90 of member 83 between a stud 91 (Figs. 15 and 15A) on plate 79 and a screw 92 in the end of an offset bracket 93 attached to plate 79. A lock nut 94 maintains a tight connection after the throat is properly located.

The cards are picked off the bottom of the stack in hopper 77 one at a time and moved a short distance into the machine where they are grasped and moved further to be analyzed. A pair of picker slides 95 protrude through openings 96 in table plate 76 and carry picker blades 97 which extend far enough to engage the front edge of the bottom card. Each slide 95 is loosely pivoted between a pair of oscillating arms 98 fastened to an operating shaft 99 loosely pivoted in the main side frames. Springs 100 coiled around rods 101 between the pairs of arms, press upward against the lower part of slides 95 and keep sliding pins 102 extending therefrom, in contact with the lower side of plate 76 as the slides are reciprocated back and forth.

Figure 2:
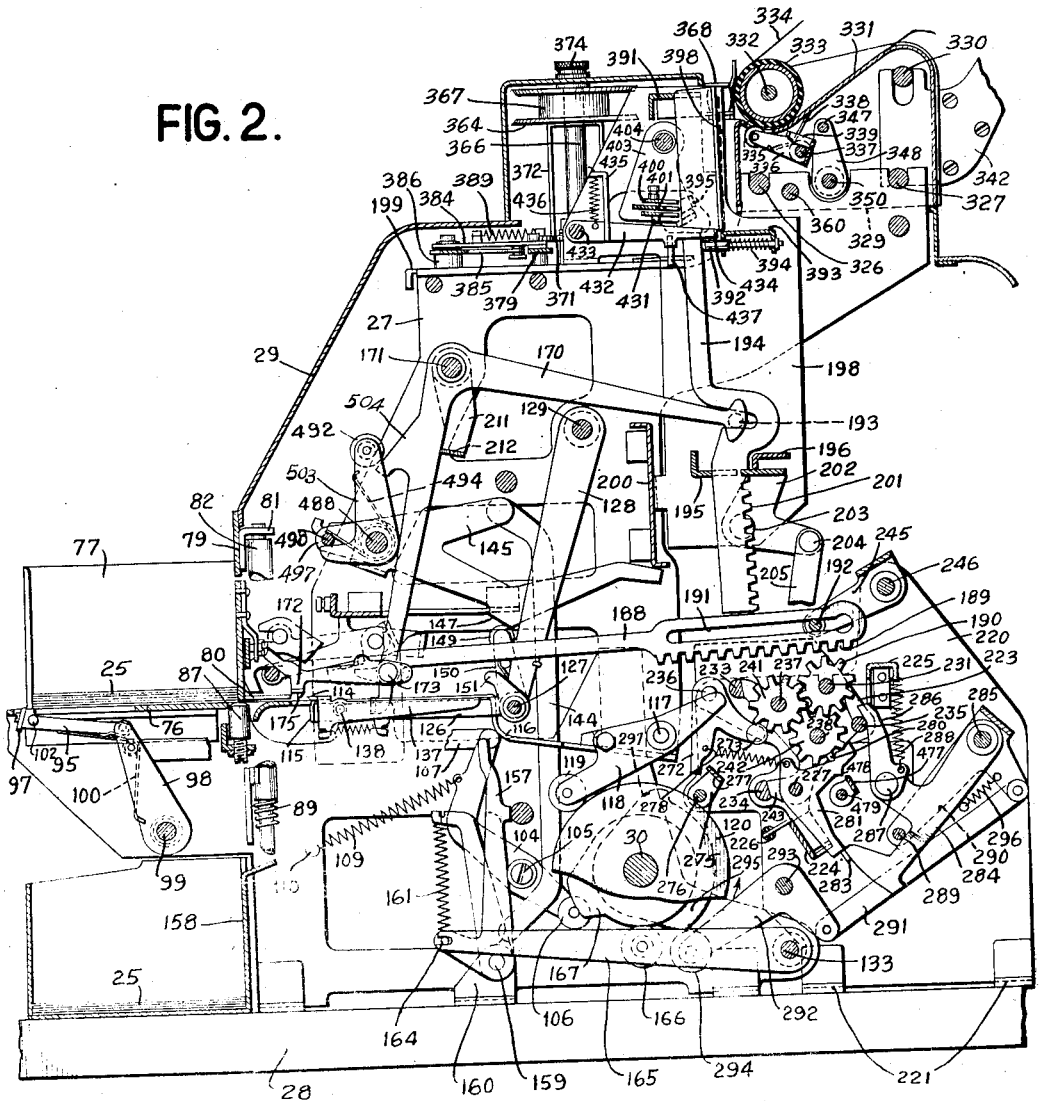
Fig. 2 is a sectional elevation of the center of the machine.

The picker slides are operated by connections driven by a cam 103 (Figs. 7, 8 and 15) fastened to main shaft 30. A lever 104 pivoted on a stud 105 on frame 27 carries a roller 106 in contact with cam 103. Loosely connected to the upper end of lever 104 is the rear end of a link 107 the other end of which is articulated with an operating arm 108 fastened to the picker shaft 99. Attached to lever 104 and a rod 110 is a spring 109 which urges roller 106 into cooperation with cam 103 so that as the cam makes one revolution, lever 104 is rocked clockwise (Fig. 15) to feed a card early in the cycle, and then near the end of the cycle the cam presents a cutout surface allowing the spring to restore the lever 104 in a counterclockwise direction, moving picker blades 97 to the left to the normal position as seen in Fig. 2.

As the picker slides 95 push a card before them into the machine a series of gripping jaws 114, 115 (Figs. 2, 15 and 15C) are opened to receive the edge of the card. Then the jaws are closed to grip the card and carry it back further into the machine before discharging it into a stacker.

Inside the machine the card rests on a swinging stacker plate 116 which is pivoted at the rear on a shaft 117. Attached to the plate 116 is a cam follower lever 118 (Fig. 8) carrying a roller 119 in cooperation with a cam 120 on shaft 30. A spring 121 (Fig. 15) attached to the top of lever 118 urges the roller against cam 120 and tends to lower the plate 116. However, the cam is shaped so that normally the front part of plate 116 is raised in alignment with the bottom plate 76 of the hopper so that the bottom card may pass over from one to the other.

The front part of plate 116 is curved downward to guide the incoming card over the top and into the gripper jaws. This part of the plate is also extended at the sides at 122 and 123 (Fig. 15C) out of the path of the cards. These extensions cooperate with embossings on the lower side of offset 80 so that there is maintained between plate 116 and the offset a space through which a card may pass.

Figure 15C:
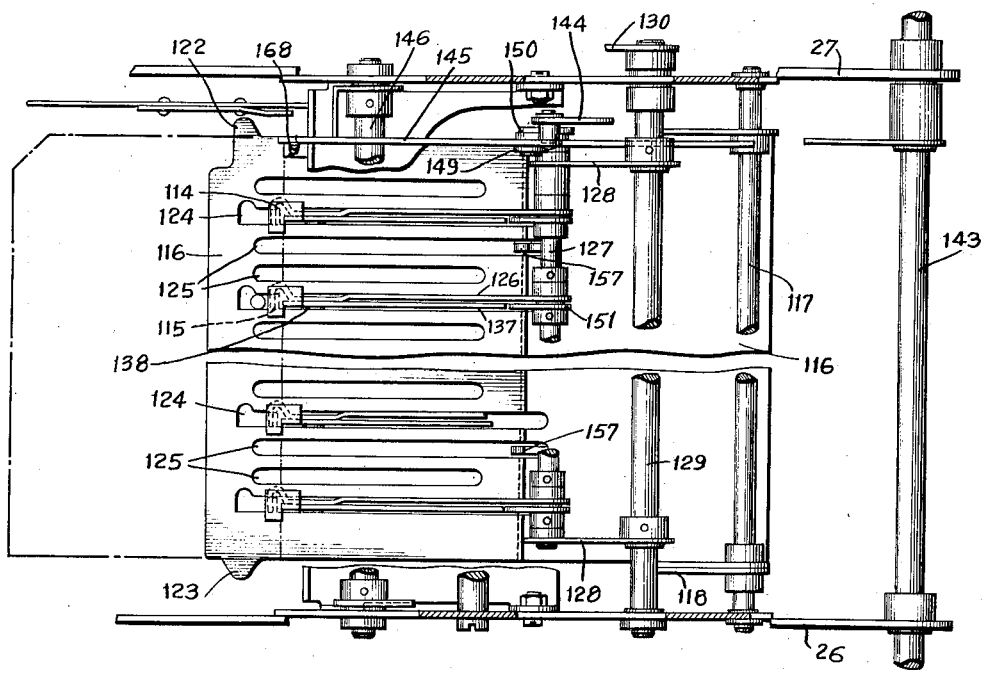
Fig. 15C is a plan view of the card grippers and card supporting plate.
Figure 15D:
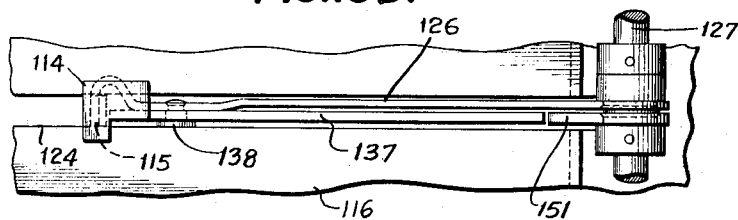
Fig. 15D is a plan view of one pair of card gripping jaws.

In Fig. 15C it is seen that stacker plate 116 is cut out with a series of slots, four wide ended slots 124 and other plain slots 125. The position of these slots laterally, corresponds with the lines of index points on the card 25 (Fig. 14) so that as a card passes over the plate the plate does not interfere with the point of a sensing finger dropped through a perforation in the card.

The sides of the four slots 124 act as guides for four sets of card gripping jaws 114, 115. Each lower jaw 115 is formed as part of a gripping link 126 which is loosely pivoted at the rear on a swinging shaft 127. This shaft is suspended in the lower ends of a pair of long arms 128 fastened to an operating shaft 129. Outside the left side frame (Fig. 3) an operating arm 130 is fastened to shaft 129 and depending therefrom is a link 131 pivoted at the lower end on a cam lever 132 fulcrumed on a shaft 133 between the side frames. On lever 132 is a roller 134 which cooperates with a cam 135 designed to regulate the movement of the card grippers. A spring 136 tends to hold the shaft 127 (Fig. 2) forward, but early in each cycle a rising cam face on cam 135 (Fig. 3) depresses the parts 132, 131 and 130, rocking shaft 129 in a clockwise direction and swinging arms 128 and shaft 127 to the rear as shown in Fig. 15, carrying gripping links 126 along therewith.

Turning again to consideration of the card gripping jaws which are moved toward the rear as explained, it is noted that the upper jaw 114 is the offset part of a lever 137 pivoted on link 126 by a stud 138. The jaws are confined to the slot 124 because the tip of lower jaw 115 (Fig. 15D) is of a width slightly less than the width of the slot, and top jaw 114 is extended in width beyond the edges of the slot in order to hold the jaw opening in alignment with the top of plate 116. A spring 139 between lever 137 and link 126 normally holds the jaws 114, 115 closed. However, devices are provided to first open the jaws as the card pickers move a card into them and then suddenly close the jaws before the card is pulled towards the rear. At the mid-point of the cycle, the jaws are again opened to allow the card to fall into the stacker, after which the jaws are closed before being moved to the front of plate 116.

The jaw moving devices include a cam 140 fixed to shaft 30. This cam cooperates with a roller 141 on a lever 142 fulcrumed on shaft 133 supported in the side frames. Pivotally connected to the end of lever 142 is the lower end of a link 144 which at the upper end is articulated on a jaw camming lever 145. The lever is pivoted on a shaft 146 and formed with a pair of cam faces 147 and 148 adapted to cooperate with a roller 149 on a jaw operating lever 150 fastened to shaft 127. Also fastened to shaft 127 are a series of four short operating arms 151 each of which is aligned with the rearwardly extending tail on one of the jaw levers 137. A coil spring 152 between levers 150 and 128 tends to rock shaft 127 in a clockwise direction to keep arms 151 away from jaw levers 137 so that they remain closed. However, early in each cycle, a rising cam face 153 on cam 140 acts to depress roller 141, lowering link 144 and rocking lever 145 in a clockwise direction so that a cam face 147 thereon pushes roller 149 to the left, Fig. 2, rocking lever 150, shaft 127 and arms 151 counterclockwise, said arms rocking levers 137 clockwise about pivots 138 to open jaws 114, 115. Then the picker devices shove the edge of a card into the jaws and, immediately thereafter, a depression 154 in cam 140 permits the jaw opening devices to be retracted as urged by a spring 168 pulling lever 145 counterclockwise away from roller 149 so that spring 152 may rock arms 151 away from jaw levers 137, permitting the jaws to close on the card under the tension of springs 139.

With the card gripped in jaws 114, 115 it is then drawn toward the rear along the top of plate 116 by the swinging movement of arms 128 and shaft 127 on which the gripping links 126 are pivoted. At the end of this rearward movement of the card, and after it has been completely analyzed, a depression 155 in cam 120 allows lever 118 to rock plate 116 downward to the card discharging position. At the same time the jaw opening devices are again made effective by an extending surface 156 on cam 140 which presses surface 148 on cam lever 145 against roller 149 to rock arms 151 and levers 137 and open the gripping jaws. The gripping members, link 126 and lever 137 are rocked down with the plate 116 because of the confining conformation of jaws 114, 115 which are held by the sides of slot 124.

Near the middle of the cycle (Fig. 15) while plate 116 is tipped down towards the front of the machine and jaws 114, 115 are opened, a pair of stacker fingers 157 are rocked down along two of the slots 125 behind the descending card to insure that the card is deposited in a stacker bin 158 placed under the front of the machine. These fingers 157 are attached to a shaft 159 (Fig. 7) which is pivoted in a bracket 160 attached to base 28. A spring 161 (Fig. 15) drawn between a stud 162 on a crank arm of one of the fingers and a vertical extension 163 of one side of bracket 160, tends to hold the fingers retracted towards the rear of the machine. But the other finger carries a stud 164 engaged by a slot opening in the end of a cam follower arm 165 loosely pivoted on shaft 133. A roller 166 on arm 165 cooperates with a cam 167 fixed to shaft 30. An extension on the cam pushes down the roller 166 and arm 165 to rock fingers 157 counterclockwise so that they shove the card before them down the inclined plate 116 and into bin 158.

Directly after the mid-point of the cycle, fingers 157 are drawn back by spring 161 as the cam face on cam 167 recedes, and plate 116 is lifted to normal position by cam 120. Then also, roller 141 is allowed to move toward the center of cam 156 and the connected linkage, as urged by a spring 168 attached to lever 145, allows the jaws 114, 115 to again close. Toward the end of the cycle, cam 135 (Fig. 3) allows the linkage 132, 131, 130 shaft 129 and arms 128 (Fig. 15) to move the jaw links 126 and levers 137 gradually towards the left to the normal position (Fig. 2) in which they are adapted to receive the next card.

The card sensing differential mechanism

As the card moves towards the rear of the machine, sensing devices are brought into registration with the perforations therein, and said devices are moved directly by the card differentially according to the location and value of the perforation. For example, a "9" perforation which is the first to be sensed, since it is near the leading edge, will move the cooperating differential device through nine steps of movement, while a "1" perforation, which is sensed much later, will actuate a device through only one step of movement.

Figure 2A:
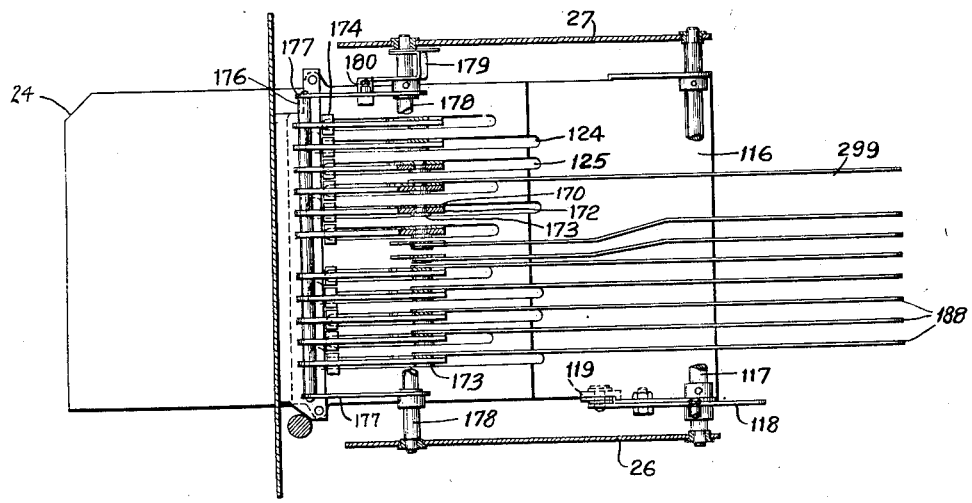
Fig. 2A is a plan view of the card sensing fingers and differential bell cranks.

The differential devices include a series of settable bell cranks 170 (Fig. 2) pivoted on a shaft 171 each carrying a sensing finger 172 held thereon by stud 173. As seen in Fig. 2A, the ends of fingers 172 are broadened at 174 to extend beyond the sides of the slots 124 and 125 over which the fingers are normally poised. At the bottom of each finger is a point 175 which rests on the card 25 until a perforation appears. Then the point drops into the perforation and the front edge of the point is engaged by the edge of the perforation and thus, as the card continues to move towards the back of the machine the finger and the related bell crank 170 are drawn a differential distance towards the rear by the card. Each card moves towards the back a like amount, but the distance through which the bell crank is moved is dependent on the differential location of the controlling perforation.

Normally all the fingers are held above the path of the card by a common rod 176 which extends across the machine under slanted cam faces on the front of the fingers. The rod is attached to a pair of arms 177 fixed to a shaft 178 loosely pivoted in the side frames. Pivoted on shaft 178 is a bail 179 for operating the arms 177. This bail is formed with two offset lugs, the one lug 180 passes under the left arm 177 and the other lug 181 is in the path of a pushing member 182 riveted to the picker link 107. When the parts are in the home position (Fig. 2) a spring 183 (Fig. 15) holds up the arms 177, rod 176 and fingers 172. However, as the card picker devices near the end of the movement induced by cam 103, member 182 strikes lug 181 and rocks bail 179 in a counterclockwise direction. Attached to the bail is one end of a strong spring 184 the other end of which is fastened to the left arm 177. This spring 184 tends to make arms 177 follow the bail 179 and move down to a position wherein rod 176 allows the fingers 172 to descend with points 175 resting on the card which is then gripped by the jaws 114, 115.

At this point it is well to explain that the card is moved rearwardly by two agencies. It is first moved a short distance by the picker devices and then drawn through a longer distance by the grippers on the swinging arms 128. During the initial movement of the card, the sensing fingers are merely allowed to move down in cooperation therewith, but during the latter movement, the card moves the fingers and the connected bell cranks 170 differentially towards the rear.

The bell cranks 170 are guided by a slotted angle plate 185 fixed between the side frames. Spring 183 is attached to this plate and urges the arms 177 upward to stop against the bottom of plate 185 as soon as the picker member 182 moves towards the front of the machine. Bail 179 is rocked clockwise along with arms 177 because at this time, since member 182 is away from lug 181, spring 184 moves lug 180 against arm 177 and the two parts move as one under the influence of spring 183. With rod 176 raised, fingers 172 are cammed up out of the path of the next card when they are swung forward in the restoring motion.

Provision is made to prevent the fingers from swinging too far in a counterclockwise direction around center 173 when the card is lowered as in Fig. 15. This means takes the form of an extending foot 186 on bell crank 170, said foot engaging under a pin 187 on the side of the connected finger 172.

Turning to the plan view in Fig. 2A, it is seen that thirteen bell cranks 170 are provided, eleven of which are connected to fingers 172 while the other two are merely connected to the actuators for the overflow banks of the accumulator. The three fingers at the left of the machine are devoted to sensing the date perforations in the card 25, Fig. 14, the next finger senses the transaction perforations, the two adjoining fingers may be used for other special perforations such as clerks and department identification not shown on the card. The five fingers at the right of the machine are used to sense amount perforations such as those representing $27.53 in Fig. 14.

Each of the seven differential bell cranks 170 at the right of the machine (Fig. 2A) is pivotally connected by stud 173 to an accumulator rack 188 extending horizontally (Fig. 2) toward the rear of the machine with a series of rack teeth 189 for operating an accumulator pinion 190. The racks are slotted at 191 to engage a common operating rod 192 which is lowered and raised to mesh and demesh the rack teeth and the pinion.

The horizontal arm of each differential bell crank 170 is pivotally connected through a pin and slot connection 193 to a vertically sliding type bar 194. A slotted guide plate 195 and an L shaped aligner 196 serve to guide the lower ends of the type bars. Both of these guide plates 195 and 196 are fixed to a pair of separate removable printer side frames 197 and 198 which are fastened to cross plates 199 and 200 secured between the main side frames.

An aligning means which cooperates with the type bars not only serves to align the printed impression, but also locates the entire differential linkage in the proper adjusted position. Into the rear side of the lower end of type bars 194 there are cut a series of aligning notches 201 which pass before the crossbar of a bail 202 pivoted on studs 203 on the printer side frames (Fig. 8). The left arm of the bail is extended and carries a stud 204 on which there is pivoted the top end of a link 205 reaching down to a connection 206 (Fig. 5) with a cam follower arm 207 loosely pivoted on shaft 133. On arm 207 is a roller 208 cooperating with a cam 209 fastened to operating shaft 30. At the middle of each cycle, after the differential linkage and the type bars are positioned by the perforations in the card, a depression in cam 209 allows arm 207 to rock counterclockwise as urged by spring 210 (Fig. 3) which then rocks bail 202 counterclockwise (Fig. 2) to push the crossbar into the notches in the adjusted type bars to locate and lock the differential mechanism in a definite manner while printing takes place. Soon after printing the cam 209 is effective to actuate the aligner linkage and move the crossbar of bail 202 away from the notches in the type bars so they may be restored during the last half of the cycle.

A common restoring means is provided to control the return of the differential bell cranks 170 to their home positions. Loosely mounted on the shaft 171 (Fig. 2) is a restoring bail 211 with a cross member 212 extending across the machine behind the bell cranks. The right side of bail 211 is extended (Fig. 6) and a pivot 212 is provided thereon for the top end of a link 213 which at its lower end is articulated on an operating arm 214 pivoted on shaft 133. A roller 215 on arm 214 cooperates with a cam 216 which allows a spring 217 to pull bail 211 gradually in a counterclockwise direction away from the rocking differential bell cranks 170 during the first half of the operating cycle. Then during the remainder of the cycle the cam 216 acts positively on the restoring linkage to turn bail 211 in a clockwise direction and thereby push cranks 170 (Fig. 2) in the same direction to the normal position.

The accumulating mechanism

Adding and subtracting devices are provided to accumulate the amounts on cards relating to credit transactions such as Cash, Charge, C. O. D. and C. O. D. collections, while the other debit amounts such as mechandise returned for cash, merchandise returned on account and cash on account are subtracted.

The accumulating devices are held together as a unit within a separately removable frame comprising a pair of side frames 219 and 220 (Figs. 2, 3, 6, 16 and 17) attached to footing brackets 221 secured to the base 28. Within the main outer accumulator frame is a smaller shiftable frame carrying the accumulator gearing which may be varied to get reverse motion for subtraction. The small frame is made up of a pair of side frames 222 and 223 spaced apart by brackets 224 and 225 secured thereto. A spring 226 atached to bracket 224 and accumulator side frame 220 urges the sliding frame towards the left (Fig. 16) to the subtractive position. However, a rod 27 (Fig. 17) attached to the small frame and adapted to slide in bearings 228 and 229 in the main accumulator frames, abuts against the side of a shift cam plate 230 (Fig. 16) which normally holds the gearing in adding position. A shaft 231 on which the adding pinions are pivoted is secured to the small frame and guides it by sliding it in an open ended slot 232 (Fig. 6) in right side frame 219. The sliding frame is stiffened from within by three brace rods 233, 234 and 235 riveted to side plates 223 and 224. Other shafts 236, 237 and 238 are removably held in the small frame; the ends of these shafts are notched and a key plate 39 (Fig. 16) on frame 222 holds them in place.

Within the small sliding frame are seven banks of accumulating gearing. Each bank comprises four pinions, the adding pinion 190 (Fig. 16) a subtracting pinion 240, a reverse motion idler pinion 241 and an accumulator wheel pinion 242. Pinion 190 meshes directly with wheel 242 but pinion 240 instead meshes with the idler 241 which in turn engages the main pinion 242. Thus, accumulator wheel 242 is adapted to be moved in two directions, in an adding direction by pinion 190 and in the reverse subtraction direction by operation of pinion 240. Pinions 190 and 240 are pivoted on shaft 231, idlers 241 are on 237 and the main pinions 242 are on shaft 238. In the normal position of the parts, the seven adding pinions 190 are in alignment with the seven operating racks 188, but when the frame is shifted to the left the subtraction pinions are positioned to be engaged by the racks when the racks are lowered. A series of spacers 243 are placed between the pinions of adjacent orders to stiffen the shafts and confine the moving parts.

The rod 192 (Fig. 2) normally holds the racks 188 out of mesh above pinions 190 and maintains this position during the differential rack adjustment, but after the first part of each cycle the rod and racks are lowered into effective position before the racks are restored differential distances toward the front. Rod 192 is attached to a bail 245 which extends across the unit (Fig. 16) and pivots on a shaft 246 between side frames 219 and 220. The right arm 247 (Fig. 6) of bail 245 is lengthened and a spring 248 attached thereto tends to rock the bail in a counterclockwise direction but it is stopped by an offset 249 on a cam follower lever 250 pivoted on stud 251 extending from side frame 219. This lever 250 is normally drawn against a stop pin 252 by a spring 253, but when a roller 254 (Fig. 6A) thereon is struck by a cam 255 on shaft 30, the lever is rocked in a clockwise direction. Since spring 248 (Fig. 6) is attached between offset 249 and bail 245, when the offset moves to the right the bail follows after and in so doing rocks rod 192 in a counterclockwise direction about shaft 246, and lowers the racks 188 into mesh with the accumulator pinions.

The racks are held in mesh because offset 249 is locked in operated position by a shoulder 256 on a latch 257 pivoted on a stud 258 on frame 219. A bow spring 259 pushes latch 257 in a counterclockwise direction and tends to hold shoulder 256 against offset 249 so that rack engagement is maintained. However, late in the second half of the cycle, after the racks have been restored latch 257 is pushed clockwise, offset 249 is tripped off shoulder 256 and spring 253 restores lever 250 and bail 245, lifting the racks 188 out of mesh after they have been moved forward to their home position. This tripping is done by means of a pin 260 on a total cam 261 fastened to shaft 30. The pin cooperates with a latch operating lever 262 (Fig. 6B) pivoted on a screw stud 263. Lever 262 is formed with an offset lug 264 positioned under an interposer lever 265 pivoted at 266 on a total taking link 268 which is normally positioned with an extension 267 on lever 265 overlying the lug 264. The top part of interposer 265 is directly under an offset extension 269 on latch 257 so that when pin 260 rocks lever 262 clockwise, interposer 265 is lifted to raise extension 269 and rock latch 257 so that shoulder 256 is moved away from offset 249 on the rack meshing follower 250 to allow the racks to be disengaged. After offset 249 escapes past shoulder 256, latch 257 is held against the lower edge thereof by spring 259. Interposer 265 is restored by a spring 270 which holds it down against a stud 271 on slide 268.

During the time that the racks 188 are held out of mesh, the accumulator pinions are prevented from turning by a series of detents 272 (Fig. 2) pivoted on shaft 236, each carrying a positioning roller 273 which normally rests between teeth on the pinion 241. In order that the operation of the detents may be synchronized with the meshing and demeshing of the racks, the detents are moved away from pinions 241 by the same lever 250 (Fig. 6) that controls the racks. When lever 250 is rocked clockwise to engage the racks, it also pushes against a tab 274 on a detent bail 275 loosely pivoted on a rod 276 held in the accumulator side frames 219 and 220. Inside the frames the crossbar 277 of the bail 275 cooperates with the ends of vertical arms on detents 272 so that when the bail is rocked in a counterclockwise direction by lever 250, the detents 272 are rocked in a clockwise direction by crossbar 277 so that rollers 273 are moved out of the path of the teeth on pinions 241 and the accumulator gears may be adjusted freely. However, springs 278 attached to the detents are pulling continuously with the result that as soon as lever 250 is unlatched and moved counterclockwise to demesh the racks, crossbar 277 is moved to the right, and springs 278 swing detents 272 into the effective normal position.

Figure 16:
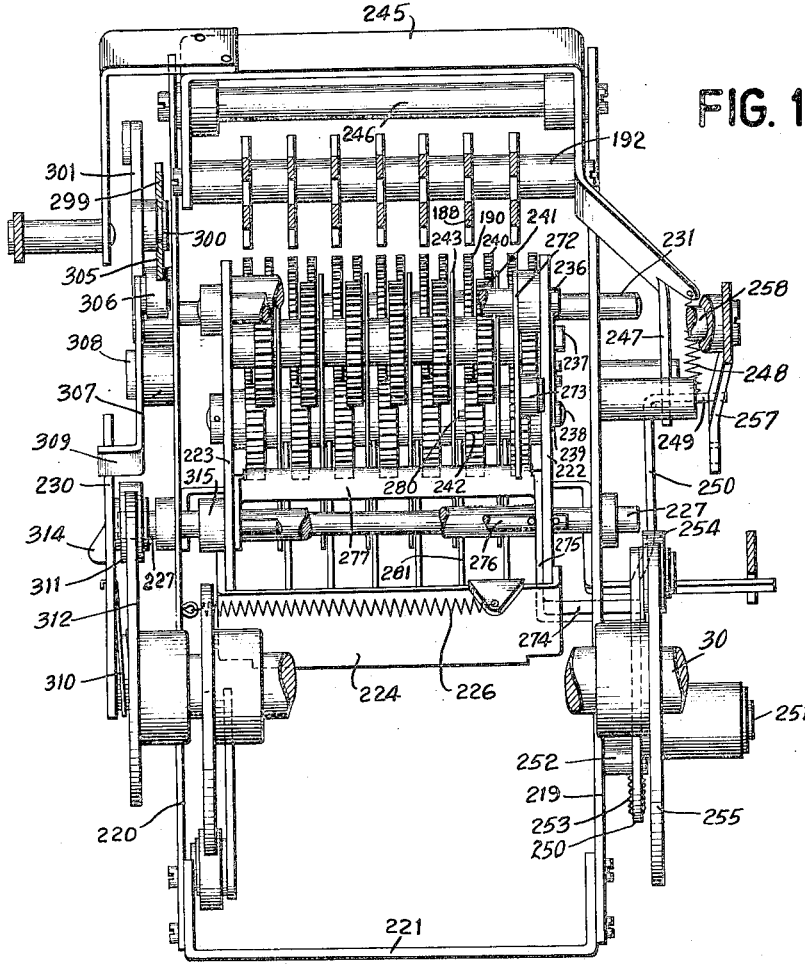
Fig. 16 is a front elevation view of the accumulating mechanism.
Figure 17:
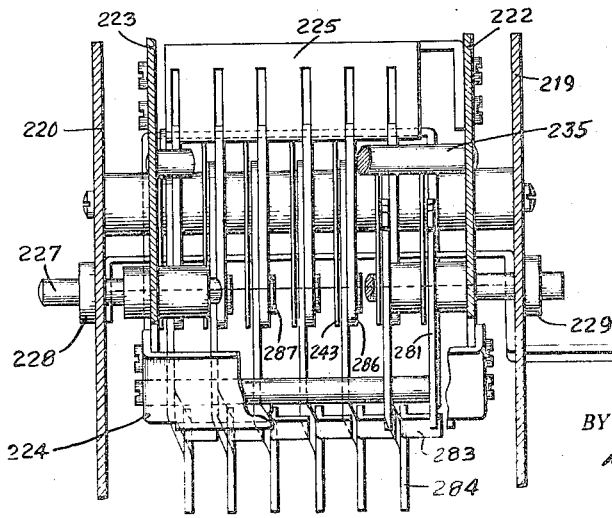
Fig. 17 is a sectional elevation view of the transferring mechanism.

Adding operation is carried on as long as the inner shiftable accumulator frame is not shifted from the position shown in Fig. 16 wherein racks 188 are aligned to mesh with adding pinions 190. Referring to Fig. 2, the adding cycle may be studied by noting that racks 188 are moved to the rear under control of the card while out of mesh. Then, upon completion of the rearward differential movement, the racks are meshed with pinions 190 and moved forward positively. In so doing they turn pinions 190 in a counterclockwise direction and pinions 242 in a clockwise direction. After the forward movement of the racks is completed they are disengaged and then transferring takes place to add units in higher orders wherever the next lower order wheels have turned more than nine steps.

Each accumulator pinion 242 is formed with a transferring cam extension 280 (Figs. 2 and 16) which protrudes to the side of one of the teeth on the pinion. When the pinion is in the normal "0" position the extension 280 is at the left (Fig. 2) of an obtuse camming point formed on a transfer trip lever 281 pivoted on shaft 227. There are six such trip levers, one cooperating with each of the six lower order wheels 242. The levers are guided at the bottom by the slotted construction of bar 224 and they are pulled counterclockwise against extensions 280 by springs 278. Cooperating with the lower edge of each trip lever 281 is an offset 283 on a transfer member 284 loosely pivoted on a shaft 285.

Each member 284 carries a transfer pawl 286 loosely pivoted at 287 and sliding over fixed rod 235 as urged by a spring 288 when the member is released. The upper ends of pawls 286 are so guided vertically by slots in brace bar 225 that they are positioned to cooperate with adding pinions 190 in the normal adding cycle when racks 188 operate these pinions. When pinions 240 are shifted over into line with racks 188 for subtraction operation, they also come into line with pawls 286 for actuation in subtractive transfer borrowing. The member 284 are bent to the right (Fig. 17) at the lower end so that although offset 283 cooperates with trip lever 281 relating to a lower order, the pawl 286 on the same member cooperates with the pinion of the next higher order so that when more than nine units are added in the lower order, a transferred unit may be added in the higher order by the pawl.

Members 284 are restored and controlled in transferring movement by a common rod 289 fixed in a bail 290 swinging loosely on shaft 285 inside the accumulator frames. A link 291 connects the bail to a cam follower crank 292 pivoted on a screw stud 293 on frame 220. A roller 294 on the crank cooperates with a cam 295 fixed to the main drive shaft 30. The cam is formed to hold the rod 289 a short distance from members 284 during the movement of accumulator wheels 242 so that if any of the wheels move through a complete rotation in a clockwise direction, extensions 280 strike the related levers 281 and push them away from offsets 283 so that springs 288 may move the tripped members 284 a short distance till they abut against rod 289. This tripping operation is merely preliminary to the effective transferring operation which takes place late in the cycle when a depression in cam 295 allows a spring 296 to pull the bail 290 clockwise, lifting rod 289 so that the tripped members 284 may be lifted by springs 288 to actuate the related transfer pawls 286 upward to turn certain pinions 190 one step in the counterclockwise adding direction. If a wheel 242 should be standing at "9" when operated by the transferring parts, it immediately trips the associated lever 281 and member 284 to add a unit in the next higher order.

A rising edge on cam 295 takes effect at the middle of each adding cycle, before the forward stroke of racks 188, to restore the members 284 that have been tripped on the previous cycle. Thus rod 289 is swung counterclockwise by positive action of cam 295. At the top of the rising face, cam 295 is extended at 297 to give rod 289 an extra counterclockwise movement of short duration to move offsets 283 down under the ends of levers 281. However, when the pinions start moving in addition, rod 289 is shifted clockwise a short distance to the left (Fig. 2) of members 284 so that the short preliminary transfer tripping action may take place.

The addition of a total amount is registered as the summation of the clockwise movements of wheels 242; said movements being imparted by the differential actuation of pinions 190 by racks 188 and the transfer ratcheting of the same pinions by pawls 286. A direct measure of the value of the total is registered in the distances that the extensions 280 have moved from the left side of the cam points on trip levers 281. In taking a total reading, as described more fully hereinafter, the extensions 280 are moved back toward the ends of levers 281 the same amount that they were moved forward in adding.

In order to subtract certain amounts entered by the differential movement of racks 188, the small pinion carrying frame is shifted to place pinions 240 (Fig. 16) instead of pinions 190 in alignment with racks 188 and pawls 286. Then, since pinions 240 turn wheels 242 through idlers 241, the direction of movement of wheel 242 is reversed and it is operated counterclockwise in subtraction.

The shifting of the pinions is controlled by differential devices cooperating with the column of sales classification perforations shown in the fourth column from the left in Fig. 14. The four upper credit classification positions are not controlling for pinion shifting, but should a perforation appear in any of the three lower debit index point positions, the pinions are shifted in a manner about to be described.

Referring to Fig. 2A it is noted that in the fourth position from the left side of the machine, the classification bell crank 170 is pivotally connected to a subtraction link 299 extending toward the back of the machine. This link is slotted and at the rear (Fig. 3) it slides over a stud 300 on a crank 301 pivoted at 302 on frame 220. Crank 301 is normally stationary, being held so by a spring 303 which pulls it against a stop stud 304. The lower part of link 299 is formed with a cam face 305 which is sufficiently remote from a cooperating roller 306 so that the roller is not depressed when the link is moved a short distance such as the movements caused by a perforation in any of the upper credit classification positions on the card 25 (Fig. 14). However, should the link be moved a substantial distance due to the early cooperation of classification finger 172 (Fig. 2A) with a debit perforation, the cam face 305 (Fig. 3) depresses the roller 306 to initiate a subtractive operation.

Roller 306 is mounted on the upper end of a latch lever 307 pivoted at 308 on the left frame 220. The lower end of the latch lever is formed with a lug 309 normally locking the cam plate 230 by engagement with a shoulder thereon. It will be remembered that this plate was pointed out with reference to Fig. 16 as the one holding the pinion shifting shaft 227 to the right in adding position. The plate 230 is pivoted on stud 315 on frame 220. A spring 310 (Fig. 3) presses against the side of plate 230 and urges a roller 311 thereon against the periphery of a cam 312 fixed to shaft 30. Early in each cycle, cam 312 moves away from roller 311 to allow plate 230 to rock clockwise as urged by spring 310. Normally, movement of plate 230 is prevented by latch 307 which is turned by spring 313 so that lug 309 stops the plate to hold the shaft 227 and the connected pinion frame in adding position. However, when latch 307 is rocked counterclockwise by substraction cam face 305, lug 309 is lifted and plate 230 is free to follow the depression in cam 312. When plate 230 rocks clockwise, the shaft 227 abutting against its side is allowed to move gradually down the sloping face of a bent portion 314 so that the pinion frames 222, 223 (Fig. 16) attached to the shaft are allowed to move to the left to the substraction position as pulled by spring 226. On frame 223 there is a hub 315 which limits the movement of the frame to the left so that the seven subtracting pinions 240 are aligned with the racks 188 and the transfer pawls 286.

During a subtraction operation the racks 188 are moved under control of the card in the same manner as in addition. The racks are held raised by rod 192 during the rearward setting movement and lowered to mesh the teeth 189 thereon during the forward stroke, just as in addition. The difference in subtraction operation results because rack teeth 189 mesh with pinions 240 (Fig. 16) instead of pinions 190. Rotation of pinion 240 causes clockwise rotation of pinion 241 (Fig. 2) and counterclockwise operation of the meshed accumulator wheel 242. In turning subtractively a wheel 242 strikes the cam point on transfer trip lever 281 with extension 280 every time the wheel passes from the "0" position to the "9" position. This serves to initiate a borrowing transfer operation in the next higher order. When lever 281 is rocked clockwise, member 284 is released and then late in the operation, pawl 286 is allowed to rise and push pinion 240 one step counterclockwise. Pinion 240 does not mesh directly with wheel 242 but drives the wheel indirectly through idler pinion 241 and in this way the wheel is turned one step in a counterclockwise direction to borrow a unit from a higher order wheel every time a transfer pawl is tripped by a lower order wheel during subtraction.

A means is provided to disable the substraction initiating controls so that the amounts perforated in all cards, regardless of the classification thereof, are all added in the accumulator. The control is accomplished by lifting the substraction link 299 (Fig. 3) so that the cam face 305 thereon is prevented from striking roller 306 and tripping shift plate 230. The crank 301 on which the rear end of link 299 slides, is rocked in a counterclockwise movement by a link 316 connected to the vertical arm of crank 301 by a pin and slot connection 317. At the other end the link is pivoted on the arm of a bail 318 (Fig. 3A) fulcrumed on a shaft 319 supported on a bracket 320 fastened to the vertical brace plate 200 between the main side frames. Another link 321 is pivotally held on the other arm of bail 318 and on the lower end of a manipulative all-add lever 322 pivoted on a stud 323 on bracket 59. The end of the lever protrudes out of an opening in the case 29 so that it may be grasped and swung down to move the linkage against the tension of a spring 324 fastened to bail 318. As lever 322 is rocked clockwise, not only is link 321 pushed to the left, but the point of connection thereto at 325 is moved over-center so that spring 324 tends to hold the parts in adjusted position or in normal position. When adjusted, bail 318 is rocked clockwise, pushing link 316 and rocking crank 301 counterclockwise to lift link 299 and cam face 305 out of substraction effecting position.

*The carriage*

Figure 18:
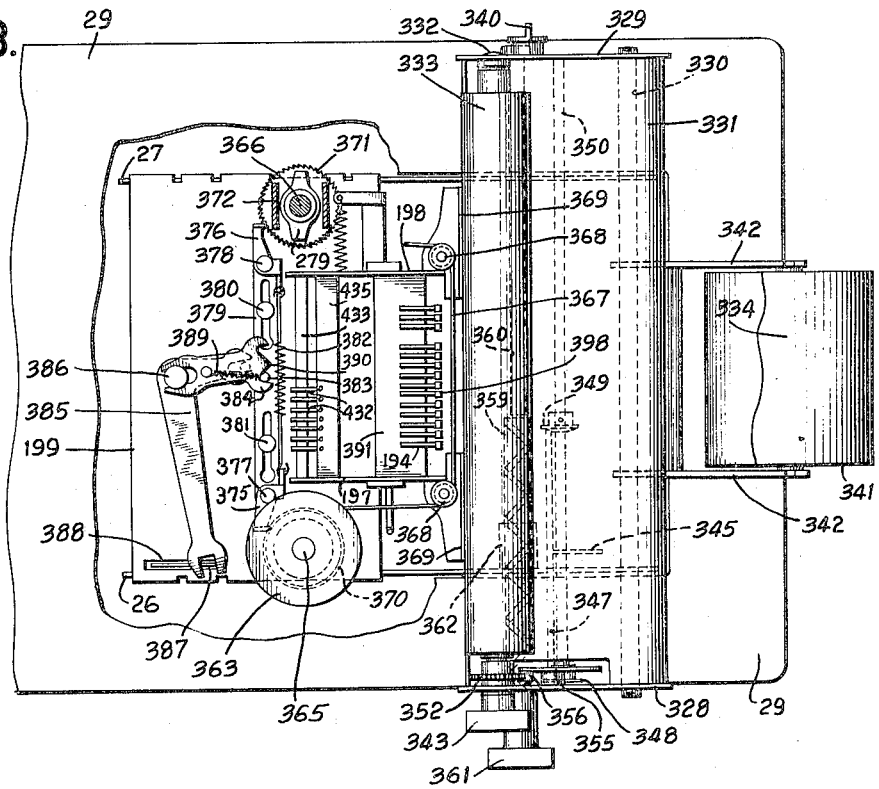
Fig. 18 is a plan view showing the ribbon feed devices, the platen, and the carriage.

The upper rear portions of main side frames 26 and 27 (Fig. 2) are extended and formed with notches to support guide shafts 326 and 327 (Fig. 2) fixed between a pair of carriage side frames 328 and 329 (Fig. 18). These carriage frames are further stiffened by a tie rod 330 and a combination casing and paper guide 331 fixed between them. Loosely pivoted in hubs on the carriage frames is a shaft 332 which carries a platen 333 a round which record paper 334 may be fed to receive printing impressions.

The paper is held against the platen by means of a set of five pressure rollers 335 each mounted on a pair of arms 336 loosely pivoted on a shaft 337 supported in the carriage side frames. Bent wire springs 338 urge the pressure rollers against the platen, but the rollers and arms 336 may be rocked counterclockwise (Fig. 2) away from the platen by means of a series of release members 339 fastened to the shaft 337 and formed with lugs overlying the arms. A manual pressure release lever 340 (Figs. 3 and 18) is fastened to the left end of shaft 337 outside frame 329 to operate the pressure rollers when it is desired to shift the paper on the platen.

The record paper 334 (Fig. 2) may be in the form of separate short sheets or part of a continuous strip unwound from a roll 341 (Fig. 18). The roll is supported on a pair of removable bracket arms 342 which are slotted to fit between shafts 327 and 330 (Fig. 2) on the carriage frame.

A manipulative knob 343 is fixed to platen shaft 332 so the record paper may be fed manually.

Figure 19:
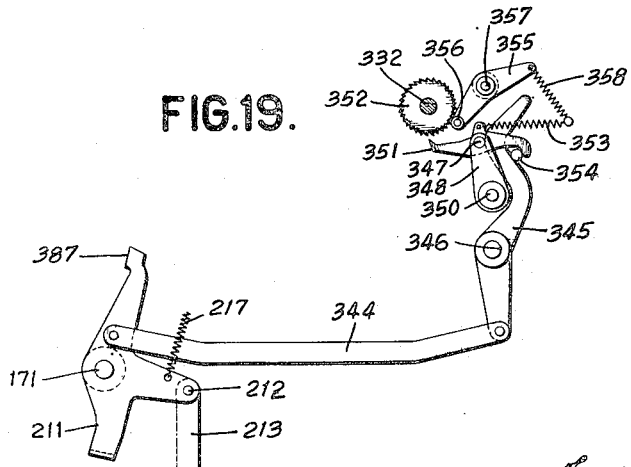
Fig. 19 is a side elevation view of the line spacing devices.

Other devices are provided to feed the paper automatically as an incident to each operating cycle. Referring to Fig. 19 it is seen that a paper feed link 344 is pivoted on adding bail 211 which rocks about shaft 171, first counterclockwise and then clockwise on each operating cycle. At the rear end, link 344 is pivoted on a feed operating lever 345 fulcrumed on a stud 346 fixed on main side frame 26. The upper end of lever 345 cooperates with a rod 347 (Fig. 18) which is part of a feed bail comprising the rod and a pair of arms 348, 349 fixed to a shaft 350 loosely pivoted in carriage frames 328 and 329. Pivoted on the right end of rod 347 is a feed pawl 351 (Fig. 19) which cooperates with a ratchet wheel 352. As lever 345 is rocked in a clockwise direction by bail 211, a spring 353 attached to feed pawl 351 urges the feed bail and rod 347 in a clockwise direction to follow the rearward movement of the lever. As this is done, the feed pawl 351 ratchets idly over the teeth on wheel 352. A stop pin 354 on the side frame 328 prevents the pawl from rocking too far in a clockwise direction and also serves normally to hold the pawl out of engagement with the ratchet wheel so that the platen may be turned back and forth by the manipulative knob 343. When the lever 345 is rocked in a counterclockwise direction by the subsequent restoring movement of bail 211, rod 347 is engaged and moves forward carrying pawl 351 along with it to turn ratchet 352 and the platen shaft 332 in a clockwise line spacing direction. Rod 347 and the bail construction connected therewith is provided so that lever 345 may be effective for line spacing action regardless of the lateral position of the carriage which is made adjustable so that printing impressions may be selectively positioned on the record sheet.

The platen is maintained in position by a detent lever 355 which carries a roller 356 cooperating with the teeth on the ratchet wheel 352 secured to the platen shaft. This detent lever is pivoted on a stud 357 on the right side frame 328 and urged into constant cooperation with the ratchet wheel by means of a spring 358 tending to turn it in a clockwise direction.

A means is provided to shift the platen carriage through a range of variable lateral positions. This is done by means of a large screw 359 (Fig. 18), secured to a shaft 360 loosely pivoted on the carriage side frames and carrying an adjustable knob 361 extending beyond the right side frame. The adjustable screw cooperates with a fixed nut 362 attached to the main side frame 26. The threads of the screw pass through the nut and hold the carriage in adjusted position; however, manipulation of knob 361 in either direction will shift the carriage back or forth into the lateral position desired by the operator.

The ribbon feed and reverse mechanism

A pair of ribbon spools 363, 364 are loosely pivoted on a pair of long vertical studs 365, 366 fixed on the top bracing plate 199. The ribbon 367 is unwound from one spool and passes around guide rollers 368 located near the platen before being wound on the other spool. The guide rollers 368 are pivoted on vertical studs secured in brackets 369 which are secured to the printer side frames 197, 198 to act as a combination ribbon holder and paper guide. The vertical surface of the brackets 369 is curved to conform with the curvature of platen 333 so that the record paper is guided between the platen and the inking ribbon. In Fig. 18 it is noted that the brackets 369 are separated at the middle to allow the type bars 194 to strike the ribbon and the record material.

The ribbon spools are driven by the ratchet wheels 370 and 371 loosely pivoted on studs 365 and 366, respectively. The wheels are held down on the studs by leaf springs 279 attached to hubs under shoulders on the studs. Attached to each of the ratchets is a vertical bracket 372 acting as a stilt to raise the ribbon spool supported thereon to the desired height. Each of these brackets is formed with an upstanding lug 373 (Fig. 6) which passes through an opening in the spool to key it to the associated ratchet. The spools are held down on the driving lugs 373 by means of knurled nuts 374 threaded on the ends of studs 365 and 366.

The ribbon spools are rotated one at a time by means of a pair of pawls 375, 376 (Fig. 18) cooperating with ratchet wheels 370, 371, respectively. The spools are designed to be turned in opposite directions and therefore the teeth on ratchet 370 face in a direction adapting the right hand spool to be turned in a counterclockwise winding direction, while the left hand spool, when operated, is turned in a clockwise direction. The ribbon feed pawls are loosely pivoted at 377 and 378 on a slide 379 adjustably secured to top plate 199 by studs 380 and 381 with shoulders passing through slots in slide 379. A spring 382 connected between the feed pawls tends to rock them and bring the pointed ends against the ratchet wheels. A driving pin 383 on slide 379 is engaged by the forked end of an operating slide 384, which is adjustably secured on the short arm of an operating bell crank 385 pivoted on stud 386 attached to the top plate 199. The end of the long arm of ribbon feed bell crank 385 is slotted to engage an upstanding projection 387 formed as part of the oscillating adding bail 211 (Fig. 11). The top plate 199 is slotted at 388 (Fig. 18) so that the extension 387 may pass through to operate the bell crank 385.

When the adding bail is oscillated during each machine cycle, bell crank 385 is first rocked in a clockwise direction about pivot 386 and then restored in a counterclockwise direction. During this movement the forked slide 384 thereon is held against driving pin 383 by means of a spring 389 which draws the slide towards the pin. Operation of the ribbon feed linkage with pin 383 engaged by slide 384 (as shown in Fig. 18) continues as long as a supply of ribbon remains wound on left spool 364; however, as soon as the ribbon is drawn taut due to the failure of the feed devices in an endeavor to withdraw ribbon from the exhausted left roll, slide 384 will be unable to drive pin 383 before it towards the right of the machine and consequently pin 383 will escape over the depressed cam point 390 to fall into the left notch on the slide so that parts are conditioned to drive feed pawl 376 instead of feed pawl 375. Thus the ribbon feed is automatically reversed. As soon as the supply of ribbon is exhausted on one spool, that spool is the one selected to be driven in a rewind direction.

The printing mechanism

It is noted hereinbefore that the machine is provided with a series of type bars 194 (Fig. 2) connected at 193 with the operating differential bell cranks 170 to be adjusted thereby and lifted to variable vertical positions according to the data represented by the perforations on the record card which is used to adjust the bell cranks. It was noted that the lower end of the bars are guided by slots in a bracket 195 and the accurate positioning of the bars is insured by the alining bail 202. The upper ends of the type bars are also guided by means of a slotted bracket 391 fixed between the printer side frames 197, 198. The bars are normally pressed towards the front of the machine away from the platen and ink ribbon by means of a set of restoring plungers 392 slidably mounted in a frame 393 secured between the printer side frames. Around each plunger is wound a coil compression spring 394 pressing the plunger towards the left and tending to keep the contacting type bar out of printing position.

Referring to the plan view in Fig. 10, it is noted that the machine is provided with thirteen type bars. The seven bars 194 at the right relate to the amount printing banks. The three bars 194C in the center relate to classification representing data, and the three type bars at the left, identified as 194M, 194TD, and 194D, are the date printing members, the first being the months printing bar, the second, the tens of days printing bar, and the third, the units of days printing bar. Each of the type bars is formed at the upper end with a type face 398 comprising ten characters with the exception of the type bar 194M which is formed with a type face carrying the twelve month identifications. The amount printing bars 194 and the two date printing bars 194TD and 194D are formed with numerals arranged with the zero type on top; the "1" type, second from the top; the "2" type, third from the top, and so on, ranging down to the "7" type face at the bottom. The other date bar 194M carries the months' identification with the lettering JAN at the top; FEB, in the second position, and so on down to DEC at the bottom. The other three type bars 194C are formed with type faces representing various sales information, such as identification of the transaction, the clerk, the department, or any such form of notation.

The type bars are lifted to the differential positions on the first half of each operating cycle and they are held there while printing takes place before they are lowered in the second half of the cycle. At this mid-point of the cycle, the bars are struck from the front by a series of three striking plates 399, 400, and 401, mounted in a printing hammer bail comprising side arms 402, 403 (Fig. 2 and 10) secured to a shaft 404 rocking freely on hubs provided on the printer side frames 197, 198 (Fig. 8). Attached to an extension 405 (Fig. 10) on the left arm 403 of the hammer bail is a spring 406 which tends to pull the bail to the rear to strike the type bars with a printing blow; however, the bail is normally prevented from moving towards the rear by means of a latch 407 (Fig. 3) said latch being pivoted on a stud 408 on the left printer side frame 198. A spring 409 attached to the latch rocks it in a clockwise direction so that an upstanding shoulder at the end of the latch engages the rear edge of extension 405 to hold the hammer bail in the normal position. Latch 407 is formed with an offset lug 410 which is engaged by a tripping pawl 411 loosely pivoted at 412 on a print operating and restoring bell crank 413 pivoted on stud 414 on the left printer side frame. A spring 415 connected between pawl 411 and bell crank 413 tends to hold the pawl with a shoulder thereon overlying the lug 410 on the hammer bail latch 407. The end of the horizontal arm of bell crank 413 is pivotally connected at 416 to the upper end of the link 417 which at its lower end is articulated at 418 (Fig. 4) on a cam follower arm 419 fulcrumed on shaft 133. This print operating arm 419 carries a cam following roller 420 cooperating with a cam 421 fixed on main drive shaft 30.

At the middle of each cycle, a rising face on cam 421 strikes the roller 420 and depresses arm 419 and link 417 to rock bell crank 413 in a clockwise direction. This serves to lower pawl 411 and along therewith the latch 407 which is rocked in a counterclockwise direction to free the extension 405. Then, the hammer bail 403, 404 is released suddenly to yield to the tension in spring 406 and drive the rear edges of the striking plates 399, 400, and 401 (Fig. 10) against the front edge of the type bars to throw them against the platen and effect a printing impression on the record material. The type bars are immediately restored in a counterclockwise direction about pivot 193 (Fig. 2) by the plungers 392. The hammer bail is restored by the upper end 423 of the vertical arm of bell crank 413 which strikes the extension 405 and rocks the bail in a counterclockwise direction to again engage the extension behind the shoulder on latch 407 when the second rising cam face 424 (Fig. 4) on cam 421 depresses the print operating linkage to lower roller 420 until it rides on the outerconcentric surface of the cam. Spring 425 (Fig. 3) attached to the lower part of the bell crank 413 tends to hold it against a stop pin 426 with the print operating parts in the normal position shown in Figs. 3 and 4.

The striking plates 399, 400, and 401 (Figs. 10, 11, 12 and 13) do not cooperate with all the type bars all the time. They are shaped to effect selective printing control in a manner about to be described.

The two striking plates 399 and 400 (Figs. 11 and 12) are loose in the hammer bail, being fitted in slots in the side arms which permit the plates to slide laterally across the bail; but the center striking plate 401 (Fig. 13) is fixed to the side arms 402 and 403 of the bail. This plate 401 is formed with two striking shoulders 427 and 428, the former cooperating with the dating type bar 194TD and the latter designed to strike the character bars 194C. However, the four type bars just mentioned are designed to prevent printing therefrom when they remain unadjusted in the normal position at printing time. For this purpose the four type bars are cut with notches 395 (Figs. 2 and 10) aligned with plate 401 to render the striking shoulders 427 and 428 ineffective when the character type and tens of days type remain unmoved. Should any of these bars be lifted one or more steps in a differential setting, then the notch is out of the path of the striking shoulder and said shoulder will abut directly against the front edge of the bar to cause it to print the character selected. In this way type bar 194TD is controlled to be effective to print only when a date from the 10th to the 31st of a month is to be represented, and to be ineffective on other operations when dates from the 1st to the 9th are printed.

The right printer side frame 197 (Fig. 6) is formed with an opening 397 through which the sliding plates 399 and 400 extend to the right for zero elimination and date elimination control. The left printer side frame 198 (Fig. 3) is shaped with a similar opening 448 through which the hammer bail extension 405 protrudes for an operating connection with latch 407.

Zero elimination mechanism

The machine is provided with seven type bars for representing the amount registering portion of the machine. When amounts are to be printed representing less than seven significant digits, it is desired that the type bars to the left of the highest significant digit be withheld from printing any zeros. In this way, the amount recorded on the record material will be only that necessary to represent the total or item amount without the superfluous zeros which would otherwise be printed at the left of a small amount. For this purpose the striking plate 399 (Fig. 11) is formed with a shoulder 429 which may be moved towards the right to escape cooperation with the highest order type bars 194. A spring 430 attached to the striking plate 399 tends to pull it towards the right, but a pin 431 extending below the lower surface of the striking plate is adapted to cooperate with a series of zero elimination levers 432 (Fig. 2) which determine the extent to which the striking plate is allowed to travel before it strikes, depending on the size of the amount to be printed.

A series of seven such zero elimination levers 432 is pivoted on a rod 433 mounted between the printer side frames 197, 198 (Figs. 2 and 10). Each of the levers cooperates with a related type bar 194 by means of an offset shoulder 434 (Fig. 2) which is bent towards the left of the machine to pass under the shoulder on the type bar formed by the extending type section. The levers are guided by a slotted bracket 435 to which there is secured a series of springs 436 tending to rock the levers in a counterclockwise direction so that the ends with offsets 434 follow the type bars when they are raised to represent a significant digit. When the bars are not disturbed, they remain in the zero positions and the levers 432 are held down out of the path of pin 431 (as shown in Fig. 2). Therefore, the extent to which the striking plate 399 travels toward the right of the machine depends on the number of higher order levers 432 which have been undisturbed by reason of the cooperating type bar remaining in zero position. When released to move as urged by spring 430 (Figs. 10 and 11) the striking plate 399 and stop pin 431 will move towards the right until the pin strikes against the left side of one of the lower order zero eliminating levers 432 which has been raised along with the related type bar positioned to print a significant digit. In this way, the shoulder 429 travels towards the right to be alined in front of only those type bars representing a significant digit or lower in order than a bar which is about to print a significant digit. Since the higher order bars are left untouched by the printing movement of shoulder 429, they will not print the zeros which are alined thereon with the platen.

The zero levers 432 (Fig. 2) are supported further by a slotted bar 437 which enables them to withstand the sidewise impact of pin 431. This bar is supported between the printer side frames.

The movement of striking plate 399 is synchronized with the rest of the machine operation to occur after the type bars have been adjusted but before the hammer bail is released to throw them against the platen. This is controlled by means of the striking plate release lever 438 (Fig. 8) which abuts against the right edge of plate 399. This release lever is pivoted on a stud 439 projecting from the front of a bracket 396 (Fig. 10) on frame 197 and carries a roller 440 cooperating with an operating member 441 pivoted at 442 on a main side frame 26. Pivoted on member 441 (Fig. 6) at the end opposite to contact with roller 440 is a link 442 which at its lower end is pivoted at 443 on a cam follower arm 444 carrying a roller 445 cooperating with a zero release cam 446 attached to shaft 30. A spring 447 wound around the center 442 engages under the member 441 and tends to rock it in a clockwise direction to lift link 442 and raise arm 444 in a clockwise direction about its pivot point on shaft 133. The cam 446 normally prevents such movement, but near the middle of the cycle, after the type bars have been adjusted, a depression is encountered in the cam and roller 445 drops therein and permits a follower arm 444 to rock in a clockwise direction lifting link 442 and depressing member 441 below roller 440 so that release lever 438 (Fig. 8) may be rocked in a clockwise direction due to the tendency of spring 430 to move striking plate 399 towards the right until pin 431 strikes against a lifted lever 432.

After each printing operation the striking plate 399 is restored by cam 446 which moves the linkage in a positive way so that lever 438 rocks in a counterclockwise direction to slide the striking plate to the left, through the hammer bail, back to its normal position.

*The date printing and elimination control devices*

Mechanism is provided to cause the printing of a date with every ordinary item entering operation, but to eliminate such date printing when a total printing operation is effected. This sort of control is made possible by the construction of the date striking plate 400 (Fig. 12) which is provided with a pair of shoulders 449, 450, the former being adapted to cooperate with the months' printing type bar 194M and the latter adapted to strike the days' printing bar 194D (Fig. 10). The control lever 438 (Fig. 8) described hereinbefore as regulating the sliding movement of the zero eliminating striking plate 399 also controls the sliding movement of the date striking plate 400. The upper end of lever 438 cooperates with both plates to normally hold them towards the left (Fig. 8) and to later move away from the plates so that a spring 451 (Fig. 10) may draw the date control slide 400 towards the right to aline shoulder 450 in front of type bar 194D and place shoulder 449 directly in front of type bar 194M. A stop pin 452 on plate 400 abuts against the side of bail arm 403 to limit the movement of plate 400 towards the right so that the proper alinement is made between the striking shoulders on the plate and the type bars. This happens in the normal item entering cycles in the machine just before the hammer blow is delivered, so that the setting of the date bars is impressed on the record material. Later in the cycle, the date control plate is restored by the counterclockwise movement of lever 438 just as the zero eliminating plate 399 is restored.

It is only when a total taking cycle is initiated that date printing is eliminated by preventing movement of plate 400 towards the right as urged by spring 451 when released by lever 438. When the plate is so held in normal position, it is seen in Fig. 10 that the type bars 194M and 194D are not alined with any striking surfaces and, therefore, will not receive a printing blow. The other date printing bar 194TD will not print during a total taking cycle because then the type bar is not raised and the notch 395 therein is alined with the shoulders 427, 450 on the striking plates 401 and 400 which are therefore ineffective with regard to this dating bar.

When a total taking cycle is initiated, a link 453 (Fig. 6) is pulled down in a manner described hereinafter. The top end of this link is pivoted on a bell crank 454 fulcrumed on a stud 455 projecting from the right printer side frame 197. The upper end of the vertical arm on bell crank 454 cooperates with an offset portion 456 extending to the side of a crank 457 pivoted on a stud 458 on the printer side frame 197. The horizontal arm of this crank 457 is formed with an extension 459 normally placed out of the path of the right side of date striking plate 400. A spring 460 wound around stud 458 and caught on the side of crank 457 tends to rock the extension 459 down in the path of plate 400 to obstruct its movement toward the right side of the machine. This action of the spring is normally prevented, but when the total cycle is initiated, link 453 is lifted to rock bell crank 454 in a counterclockwise direction, freeing the other crank 457 so that it may be rocked by spring 460 to place extension 459 against the end of plate 400 to hold the plate in normal position and thus preventing the printing of a date when a total is printed.

*Total printing mechanism*

The machine is provided with devices for connecting the actuators, which are usually moved by the card, to the accumulator wheels so that the amount registered thereon may control the movement of the type bars, thereby printing a total or balance of a series of added and subtracted amounts. The total control lever TL (Fig. 3) is provided to adjust various devices in the machine so that the differential racks are engaged with the accumulating pinions to turn the pinions in a reverse direction to read off the amount previously added thereon. Other connections are controlled by this lever to interrupt card feeding and eliminate date printing. The free end of the lever extends beyond an opening near the right side of the machine adjacent the start and stop keys. It extends into the machine and is fastened to a shaft 461 which is rocked clockwise (Fig. 3) when the lever TL is depressed to initiate a total printing operation. This shaft 461 is fulcrumed in bearings on both the side frames and has attached thereon a crank 462 (Fig. 6) outside the right side frame. Pivoted on the crank is a link 463, the lower end of which is articulated on the three-armed total operating bail 464 fulcrumed at 465 on the side frame. Attached to the horizontal arm of this total bail 464 is the date eliminating link 453 mentioned hereinbefore. When the total lever TL (Fig. 3) is depressed, shaft 461 is rocked in a counterclockwise direction (Fig. 6) to rock the total bail 464 in the same manner and thereby lift link 453 to cause the date eliminating operation previously described.

A vertical arm 466 (Fig. 6) on total bail 464 is formed with a slot which engages a pin 467 extending on the side of the total slide 268 mentioned hereinbefore. This slide is slotted and has connected thereto a spring 468 normally holding it towards the left on a pair of screw studs 263 and 469. When the slide is moved to the right by the operation of the total lever, it is held in operated position by cooperation of a point 470 thereon with extension 471 projecting from the side of the pinion engaging latch 257 Since this latch is not tripped until the middle of the total cycle, the slide 268 is held in operated position for the first half of the second total cycle during which all of the functions controlled by the slide may be performed. The slide has many operating shoulders which take effect immediately upon movement of the slide to cause operations required by the nature of the total printing cycle. Other total controls are made effective when the start key ST is depressed after the total lever is adjusted. Then the clutch is operated and the main shaft turns the total control cam 261.

The lever end of total slide 268 is formed with a hook 472 which engages a pin 473 on a crank arm 474 attached to the picker operating shaft 99. When the machine is ready for a total printing operation, the picker arm 474 and shaft 99 are held toward the right in operated position by a latch member 111 (Fig. 15) the action of which is explained more fully hereinafter. As the slide is operated toward the right (Fig. 6) hook 472 moves toward pin 473 to hold the picker shaft 99 rocked clockwise so that the picker blades 97 (Fig. 2) cannot move forward to pick up a record card 25. In this way, the feeding of cards is prevented during the total printing cycle.

The total printing controls act immediately to mesh the racks 188 with the pinions 190 (Fig. 6) so that the accumulator pinions may be rotated by the rearward movement of the racks instead of by the forward movement of the racks as they are controlled during adding or subtracting operations. Early rack engagement is caused by a shoulder 475 formed near the right end of slide 268 cooperating with a pin 476 extending on side of the engagement follower lever 250. By means of this connection the lever is rocked in a clockwise direction to latch the upper extension 249 behind the shoulder 256 on latch 257. When extension 249 moves towards the rear it frees the rack supporting bail 245 which may then follow the pull of spring 248 to rock in a counter-clockwise direction and lower rod 192 to drop the racks 188 into mesh with the pinions 190.

Before the racks are operated to turn the pinions, the transfer tripping arms 281 (Fig. 2) are locked in position to act as a total stop for the extensions 280 which move counterclockwise along with accumulator wheels 242 when they are operated to take a total reading. The extensions strike the pointed cam face at the top of the transfer levers and tend to rock it clockwise, but this movement is prevented during total taking by a bail 477 which passes under projections 478 formed on transfer levers 281. Bail 477 is pivoted on a rod 479 extending through the adding unit frames and the bail is provided at the right side with an offset extension 480 which extends to the right through an opening in the side frame 219. Cooperating with extension 480 is a hook 481 on the end of total slide 268. This hook normally holds the bail against the tendency of a spring 482 urging the bail in a counterclockwise direction; however, when the slide moves toward the right, the bail is free to be moved and the cross bar thereon (Fig. 2) is rocked counterclockwise about rod 479 to place the cross bar as an obstacle under the projections 478 on the transfer levers. Thus the transfer levers act as a positive stop for the extensions on the accumulator wheels which are rotated to take the total reading of the amount accumulated thereon.

Since the differential devices are not operated by a card during the total taking cycle, other means must be provided to actuate them. These total actuators take the form of spring pressure members cooperating with the seven amount order bell cranks to urge the main actuators and the connected racks and accumulator pinions toward the normal position. This must be done impositively because the accumulator wheels may move differential amounts before coming to a positive stop. Extending to the side of total slide 268 (Fig. 6) is a stud 271 which projects through a slot 484 in a total actuating control link 485. This link is pivoted at its upper end at 486 to an arm 487 attached to a shaft 488. The lower end of the link is formed with a hook 489 that is adapted to pass under a pin 490 on a total cam follower arm 491 when the slide 268 rocks the link in a counterclockwise direction about pivot 486. Follower arm 491 is loosely pivoted on shaft 133 and urged clockwise by a spring which tends to keep a cam roller 493 thereon in cooperation with the total cam 261. As the machine is operated, the rising surface on total cam 261 depresses roller 493 and arm 491 to carry the connected link 485 downward and to rock shaft 488 in a clockwise direction. Attached to shaft 488 (Fig. 2) is a pair of bail arms 497 carrying a cross rod 498. This rod overlies the horizontal arms of a series of seven bell cranks 503 loosely pivoted on shaft 488. Each of the bell cranks carries at its upper end a roller 492 which is adapted to cooperate with a slanted surface 504 on the front part of the related actuator bell crank 170. Associated with each bell crank 503 is a spring 494 tending to rock it in a clockwise direction; however, the bell cranks are normally held out of cooperation with the actuators until rod 498 is rocked in a clockwise direction by operation of the total cam 261. Then, the bell cranks tend to follow thereafter in a clockwise direction and actuate bell cranks 170 and the connected racks 188 under the pressure of springs 494 until the accumulator pinions are rotated differentially to engage extension 280 against the transfer levers 281 to act as a positive limitation to the movement of the actuators and at the same time to raise the amount printing type bars 194 to represent the amount cleared out of the accumulator. Although the differential actuators are moved early in the second half of the total operation by the rising surface on the total cam 261 (Fig. 6) they are held in the adjusted total registering position by a prolonged dwell on the cam which serves to hold the type bars in position until the printing impression is secured.

In the second half of the total printing cycle, the main differential devices are restored by the descending cam face 495 formed on total cam 261.

Figure 6:
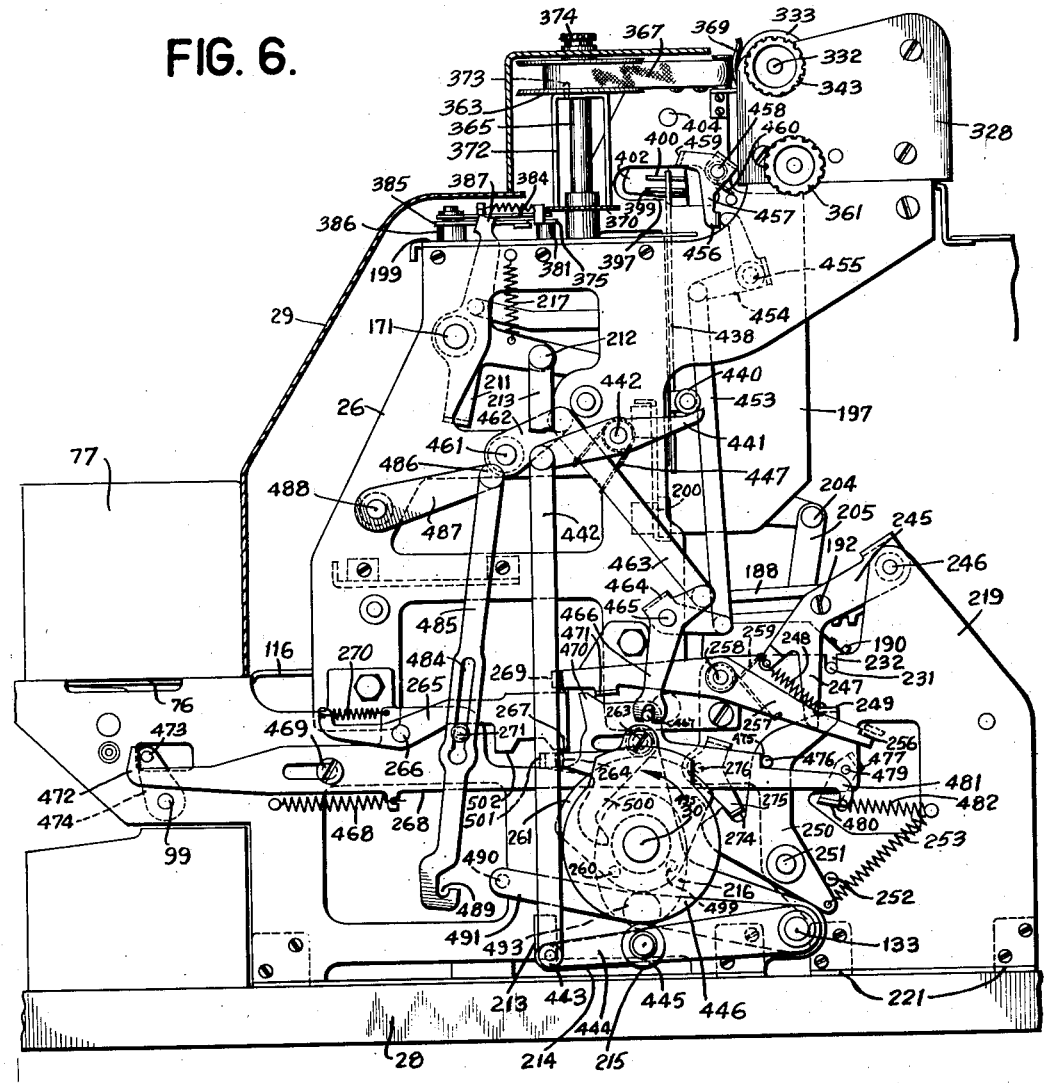
Fig. 6 is a side elevation of the machine showing the right side.
Figure 6A:
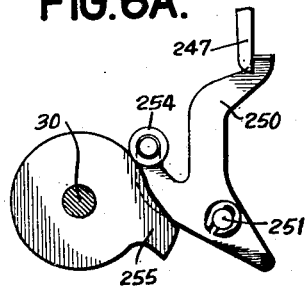
Fig. 6A is a detail view showing the operating rack engaging control cam.
Figure 6B:
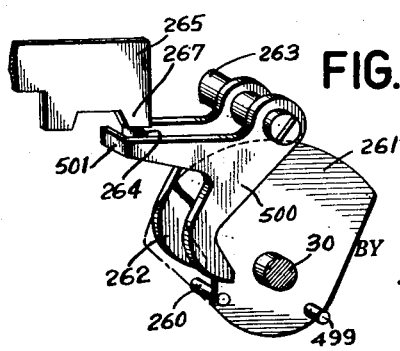
Fig. 6B is a detailed perspective view of the rack disengagement control cam.

After the total is printed at about the middle of the total printing cycle, it is necessary that the racks 188 be disengaged from the accumulator pinions before the racks are restored. This disengagement is accomplished by devices tripped by a pin 499 (Figs. 6 and 6B) on the total cam 261. As the cam rotates counterclockwise, pin 499 strikes the pointed end of a tripping crank 500 and rocks said crank clockwise about its pivot on screw stud 263. An offset 501 on the horizontal arm of crank 500 lies directly under a shoulder 502 on the interposer member 265 which is then not positioned as shown in Fig. 6, but moved to the right along with slide 268 on which it is pivoted at 266. The upper edge of member 265 underlies the offset 269 on latch 257 so that when crank 500 is rocked clockwise, member 265 is lifted under offset 269, latch 257 is rocked clockwise to push shoulder 256 thereon down out of the path of lug 249 on engaging lever 250 which is then rocked to the left by spring 248, lug 249 cooperating with extension 247 on rack bail 245 which is then lifted with rod 192 raising the racks 188 out of mesh.

At the same time that latch 257 is releasing engaging lever 250, the slide 268 is unlatched by the lifting of tab 471 on the latch, therefore shoulder 475 is moved to the left ahead of pin 476 when lever 250 is rocked for disengagement.

During ordinary item entering operations, crank 500 is operated by pin 499, but then the parts are ineffective because offset 501 is beneath the cut out portion between shoulders 267 and 502 on member 265.

Interlocks

A means is provided to lock up the card picker devices when the supply of cards 25 is exhausted in the hopper 77 or when the appearance of a total card 24 is sensed. At the same time, the stop key connections to the clutch are operated to stop the machine, making the operator aware that all the cards of a group have been analyzed and the machine is ready for a total taking cycle. Pivotally mounted on the shaft 178 (Fig. 15) is the locking member 111 with an extending tab 112 that is adapted to rest on the top of the corner of a card 25 as it is fed from the hopper. Normally member 111 is lifted and the tab 112 is elevated above the path of the cards by the cooperation of rod 176 with the underside of the member. However, at the end of the stroke of the picker link 107, extension 182 strikes crank 179 to rock it counterclockwise and pull down bail arms 177 and rod 176. Then, if an item card is present between the picker and the card feeding jaws, tab 112 is supported thereby and member 111 is prevented from rocking further counter-clockwise. If the supply of record cards is exhausted, or if a total card 24 is presented with the clipped corner freeing the member 111, tab 112 is free to fall further so that at the end of the picker stroke it falls down in front of a jutting shoulder 113 on picker plate 182 to lock the picker linkage in rearmost position and prevent further reciprocation of the pickers until after a total cycle.

Not only is the card picker movement stopped, but the member 111 also operates to declutch the driving connections to stop the machine. Supported on a shoulder stud 510 (Fig. 3) on member 111 is the slotted end 511 of a link 512 which at the rear end is pivoted at 513 on an extension arm 514 secured to rack meshing bail 245. When member 111 is allowed to drop, due either to failure of a card to feed exhaustion of the card supply in the hopper, or appearance of a total card, the front end of link 512 follows down and places a riveted extension 515 thereon in the path of the arm 70 on the stop lever 61 of the clutch. Then, later in the cycle, when bail 245 is rocked clockwise to mesh the operating racks, link 512 is pulled to the left and extension 515 rocks arm 70 and stop lever 61 in a counterclockwise direction, tripping stop member 47 off shoulder 62 and positioning it to engage clutch pawl 43 and stop the machine at the end of the cycle.

When a total cycle is initiated, member 111 is lifted to again free the picker devices, and extension 515 is lifted out of the path of stop arm 70. This is done by a link 516 (Fig. 3) pivoted at 517 on the total lever TL. The lower end of the link is slotted at 518 to allow normally the free movement of a stud 519 on the rear of member 111. When the total lever is depressed, link 516 depresses stud 519 and rocks member 111 so that tab 112 (Fig. 15) is lifted above shoulder 113. At the same time, through the pin and slot connection 510, 511, link 512 is lifted at the front to raise extension 515 to normal position. The picker devices are not released immediately when the total lever TL depresses member 111, because at the same time (while the upper end of slot 518 (Fig. 3) is approaching stud 519) hook 472 (Fig. 6) is moving towards the right to engage pin 473 which is then at the right. The picker linkage is held rearward until the total slide 268 is released after the middle of the total cycle. Then spring 183 (Fig. 15) lifts bail 177 and rod 176 to restore fingers 172 and member 111 in readiness for sensing the first card of a new group.

The machine is adapted for printing separate bills, one bill for each set of cards between the total cards and it is automatically stopped after a related set of items are printed on a bill. Then the operator may press the total lever to control the machine so that the total amount is recorded on the bill. After total printing, the machine stops so that the printed bill may be removed and a new bill form may be wound around the platen. Subsequent operation of the start key initiates another series of item printing operations under control of another set of cards.

Two cycles of machine operation are required for each total taking operation, note the timing chart Fig. 20. During the first half of the total operation the total card 24 is being sensed and it is only at the end of this portion of the operation that the stop control member 111 (Fig. 3) drops below the clipped corner of the total card. Then the machine is automatically stopped by actuating stop latch 61 as explained hereinbefore. This extra total preparatory cycle causes a paper spacing operation which advances the bill to separate the total impression from the printed items. Printing does not take place during the preparatory cycle because the elimination slides are effective. The operator then depresses the total lever TL and the start key to initiate the second half of the total operation.

Figure 9A:
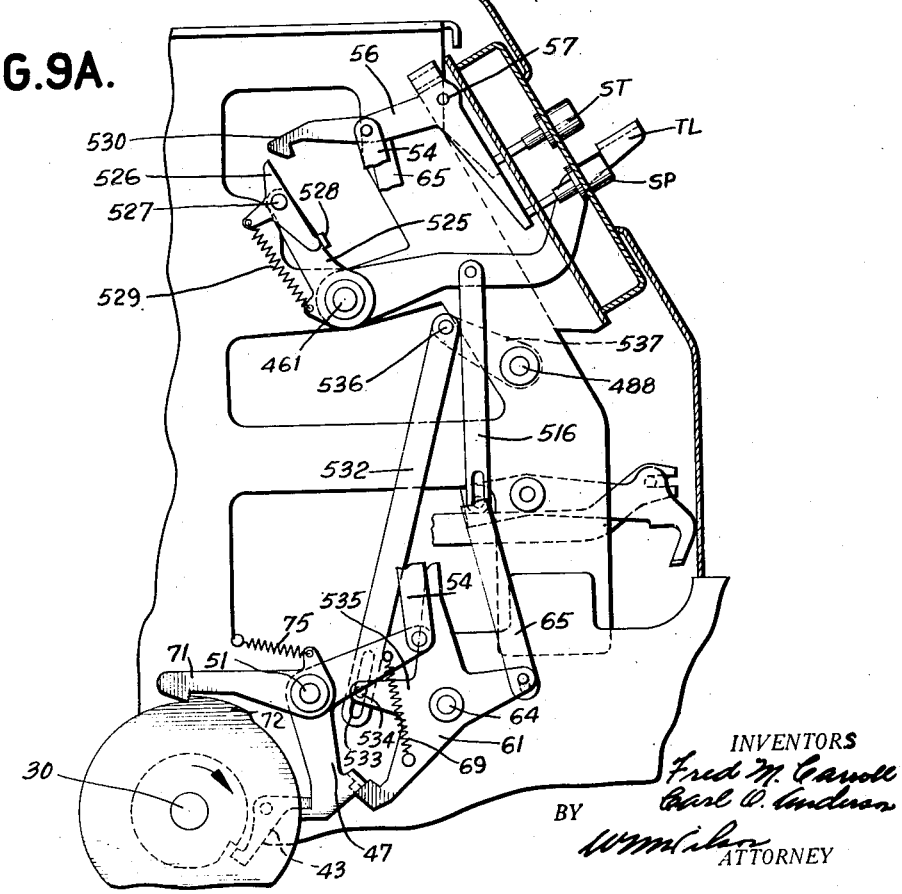
Fig. 9A is a side view of the automatic total restart and stop devices.

An alternative form of total initiating construction such as that shown in Fig. 9A may be used. The advantage of this construction resides in the automatic restarting connections which make it unnecessary for the operator to depress the start key ST, as already explained. Instead, the last part of the total lever movement trips the clutch to start the second half of the total operation. Fastened to the total shaft 461 is an arm 525 carrying a flipper 526 pivoted thereon at 527 and rocked against a stop lug 528 by a spring 529. The upper end of the flipper cooperates with a pointed cam face 530 on a rearward extension of start crank 56. Near the end of the clockwise motion of the total lever TL, flipper 526 lifts cam face 530 and rocks crank 56 around its pivot at 57. When this crank 56 is rocked in a clockwise direction by the total lever, link 54 is lifted and start member 47 moves away from pawl 43 which then engages to start the machine. Flipper 526 is adapted to pass the pointed end 530 when restored because it is free to turn on center 527.

The second total cycle causes another paper spacing operation after total printing which advances the bill so the operator may note the total amount before removing the bill.

At the end of the total operation it is desired that the machine stop to provide an opportunity to remove the old bill and insert a new one. This total stop is performed automatically by a linkage between the total setting shaft 488 (Fig. 9A) and the stop latch 61. This linkage may be omitted if it is desired to print on a continuous record sheet with an automatic continuation of machine operation and item printing after each total operation. However, for bill printing, a total stop link 532 is formed with a slot 533 encircling a stud 534 on an arm 535 extending from the stop latch 61. The upper end of the link is pivoted at 536 on an arm 537 fixed to the end of the total setting shaft 488. This shaft is always rocked counterclockwise to set the differential bell cranks during the second part of the total taking operation. As the shaft moves it depresses link 532 and the top of the slot 533 engages stud 534 to depress arm 535 and rock latch 61 counterclockwise to free stop lever 47 so that it may move in position to engage pawl 43. In this way the machine is stopped at the end of each total printing cycle.

While there is disclosed the fundamental novel features of the invention as applied to a tabulating machine, it will be understood that various omissions, substitutions and changes in the form and details of the devices illustrated and in their operation may be made by those skilled in the art without departing from the spirit of the invention. It is the intention, therefore, to be limited only as indicated by the scope of the following claims.

What is claimed is as follows:

1. In an accounting machine for entering items and printing totals, having a total taking control element, the combination of date printing type bars, means for adjusting said type bars differentially, a platen against which the type bars may be impressed to print on a record sheet, means for striking the type bars against the platen including a sliding striking plate with date print effecting shoulders each normally out of cooperation with a related type bar but adapted to be moved to abut against a date type bar to cause it to print, a stop lever for normally holding the plate in a normal position, means for moving said stop lever away from the normal position before printing takes place, a spring urging said plate away from the normal position to follow the lever and place said shoulders in position to abut against the date type bars to print on every item entering operation, and means under control of the total taking control element for stopping said plate in normal position to eliminate date printing during total taking cycles.

2. In an accounting machine with item entering devices, a type bar formed with a non-printing notch, means under control of said entering devices for adjusting said type bar differentially, a platen against which the type bar may be impressed to print on a record sheet, means for striking the type bar against the platen including a sliding striking plate with a shoulder normally in alignment with the type bar and opposite the notch therein so that if the type bar is not adjusted differentially the type bar will not be struck by the shoulder, but if it is adjusted it will be struck by the shoulder to cause printing, and a print elimination control lever for sliding the plate so that said shoulder is moved out of alignment with the type bar to prevent printing operation thereby regardless of the adjustment of the type bar.

3. In a record controlled machine with item entering and total taking devices, a main operating shaft, a motor, a clutch between said motor and said shaft, a declutching means for operating the clutch to disconnect the shaft from the motor to stop the machine, accumulating pinions, differential racks in said item entering devices for operating said pinions, means for meshing the racks with the pinions, means for sensing when the supply of records is exhausted, and means under control of said sensing means for connecting said rack meshing means to the declutching means so that when the rack meshing means operates the clutch is operated to stop the machine at the end of the cycle.

FRED M. CARROLL.
CARL O. ANDERSON.